United States Patent
Bigos

(10) Patent No.: US 11,097,486 B2
(45) Date of Patent: Aug. 24, 2021

(54) SYSTEM AND METHOD OF 3D PRINT MODELING UTILIZING A POINT CLOUD REPRESENTATION AND GENERATING A VOXEL REPRESENTATION OF THE POINT CLOUD

(71) Applicant: Sony Interactive Entertainment Inc., Tokyo (JP)

(72) Inventor: Andrew James Bigos, Stains Upon Thames (GB)

(73) Assignee: Sony Interactive Entertainment Inc., Tokyo (JP)

( * ) Notice: Subject to any disclaimer, the term of this patent is extended or adjusted under 35 U.S.C. 154(b) by 46 days.

(21) Appl. No.: 16/627,852

(22) PCT Filed: Jul. 4, 2018

(86) PCT No.: PCT/GB2018/051879
§ 371 (c)(1),
(2) Date: Dec. 31, 2019

(87) PCT Pub. No.: WO2019/008354
PCT Pub. Date: Jan. 10, 2019

(65) Prior Publication Data
US 2020/0122399 A1    Apr. 23, 2020

(30) Foreign Application Priority Data
Jul. 6, 2017 (GB) .................................... 1710876

(51) Int. Cl.
*B33Y 50/02* (2015.01)
*B29C 64/386* (2017.01)
*G06T 17/00* (2006.01)
*B33Y 10/00* (2015.01)

(52) U.S. Cl.
CPC ............ *B29C 64/386* (2017.08); *G06T 17/00* (2013.01); *B33Y 10/00* (2014.12); *B33Y 50/02* (2014.12)

(58) Field of Classification Search
CPC ....................................................... B33Y 50/02
(Continued)

(56) References Cited

U.S. PATENT DOCUMENTS 6,377,865 B1    4/2002 Edelsbrunner
7,317,456 B1    1/2008 Lee
(Continued)

FOREIGN PATENT DOCUMENTS

GB    2536062 A    9/2016
GB    2537636 A    10/2016
GB    2543097 A    4/2017

OTHER PUBLICATIONS

Schoning, Interactive 3D Reconstruction: New Opportunities for Getting CAD-ready Models, 2005, Dagstuhl Publishing, pp. 8 (Year: 2015).*

(Continued)

Primary Examiner — Suresh Suryawanshi
(74) Attorney, Agent, or Firm — Matthew B. Dernier, Esq

(57) ABSTRACT

A method of 3D print modelling includes: generating a point cloud representation of a target virtual object for 3D printing, generating a voxel representation of the point cloud by adding a respective first voxel when a respective first point from the point cloud representation is located in the notional volume occupied by that first voxel, assigning a first colour associated with the first point to the faces of the first voxel, and if a second point from the point cloud representation is located within the volume of the first voxel, assigning a second colour associated with the second point to a respective face of the new voxel corresponding to the normal of the (Continued)

second point; and thickening the voxel representation of the point cloud by generating a duplicate voxel adjacent to the first voxel along a first axis passing through two opposing faces of the first voxel respectively having the first and second colours.

15 Claims, 15 Drawing Sheets

(58) Field of Classification Search
USPC .......................................................... 700/118
See application file for complete search history.

(56) References Cited

U.S. PATENT DOCUMENTS

| | | | | |
|---|---|---|---|---|
| 2005/0182693 | A1* | 8/2005 | Alivandi | A63F 13/12 705/26.5 |
| 2016/0314617 | A1* | 10/2016 | Forster | G06T 17/00 |
| 2017/0368755 | A1* | 12/2017 | Bader | G05B 19/4099 |
| 2018/0257297 | A1* | 9/2018 | Matheu | A61L 27/50 |
| 2019/0311471 | A1* | 10/2019 | Kurabayashi | G02B 27/0172 |
| 2020/0063093 | A1* | 2/2020 | Matheu | B33Y 70/00 |

OTHER PUBLICATIONS

Garstka et al, Fast and Robust Keypoint Detection in Unstructured 3-D Point Clouds, Apr. 14, 2021, IEEE, pp. 10 (Year: 2021).*
Communication pursuant to Article 94(3) for corresponding EP Application No. 18742549.1, 7 pages, dated Feb. 22, 2021.
Combined Search and Examination Report for corresponding GB Application No. 1710876.2, 5 pages, dated Dec. 13, 2017.
International Search Report and Written Opinion for corresponding PCT Application No. PCT/GB2018/051879, 13 pages, dated Sep. 21, 2018.
Examination Report for corresponding GB Application No. 1710876. 2, 2 pages, dated Sep. 7, 2020.

* cited by examiner

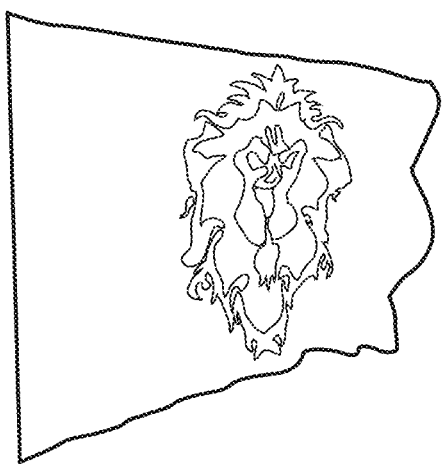
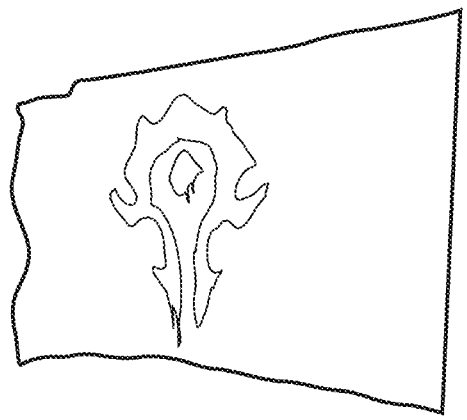
FIG. 13A          FIG. 13B
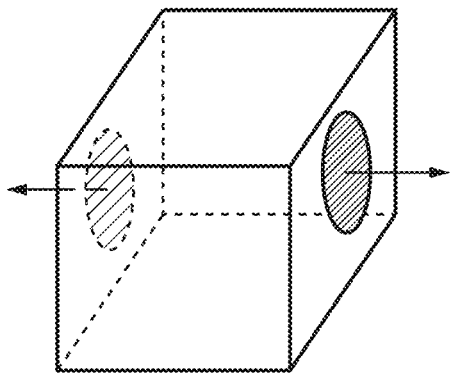
FIG. 14A
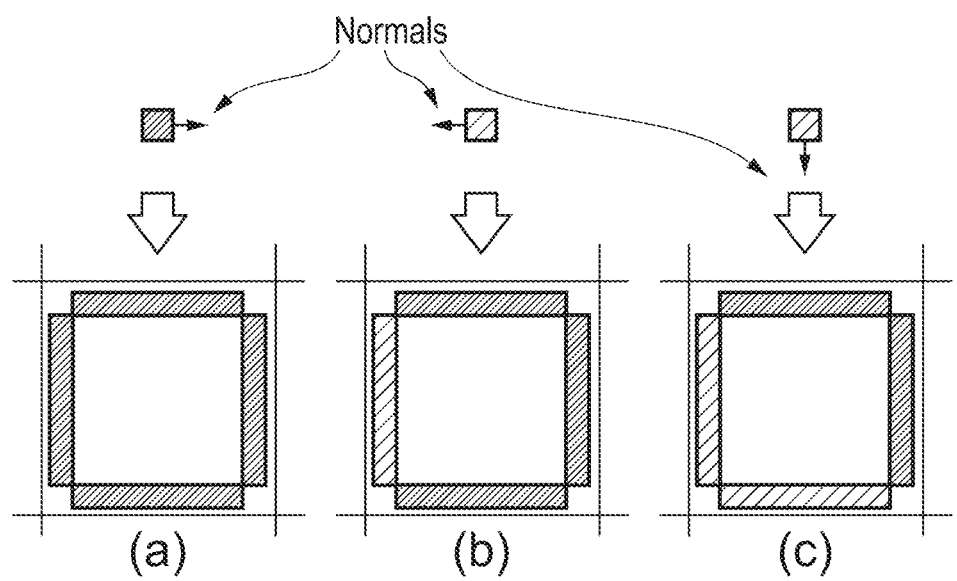
FIG. 14B

SYSTEM AND METHOD OF 3D PRINT MODELING UTILIZING A POINT CLOUD REPRESENTATION AND GENERATING A VOXEL REPRESENTATION OF THE POINT CLOUD

BACKGROUND

The present invention relates to a system and method of 3D print modelling.

3D printing is a means of volumetric printing, where instead of depositing two-dimensional pixels on a flat surface, the printer deposits three-dimensional voxels within a volume. There are numerous technologies to achieve this, including the use of lasers to melt and fuse materials such as metal powder in incremental layers to build a structure, or the use of a high-temperature print-head to deposit small droplets of plastic that cool and harden to build up a 3D model.

The design for such a 3D model is typically generated in a computer-aided design program, in which a user defines surfaces and volumes of a virtual model. A drawing list is then generated by the program specifying the order in which to fuse or deposit materials to render the virtual model using the 3D printer.

This approach has resulted in the creation of many aesthetically and functionally unique objects, some of which are difficult to make using conventional processes. However the utility of 3D printers has still not been fully explored.

SUMMARY

The present invention aims to provide a new use for 3D printers.

In a first aspect, a method of 3D print modelling is provided.

In another aspect, a device arranged to generate a model for 3D printing is provided.

Further respective aspects and features of the invention are defined in the appended claims.

BRIEF DESCRIPTION OF THE DRAWINGS

Embodiments of the present invention will now be described by way of example with reference to the accompanying drawings, in which:

FIGS. 13A and B are illustrations of a zero-thickness virtual object with different colours or textures on each side, in accordance with embodiments of the present invention.

FIG. 14A is a schematic diagram of a voxel highlighting colours associated with respective faces of the voxel in accordance with embodiments of the present invention.

FIG. 14B is a schematic diagram illustrating successive colour assignments to faces of a voxel in accordance with embodiments of the present invention.

DETAILED DESCRIPTION

A system and method of 3D print modelling are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an embodiment of the present invention, an entertainment device is operably coupled to a 3D printer. The entertainment device is arranged in operation to capture snapshots of videogame play for replication by the 3D printer, as explained later herein.

Entertainment Device

An example of a suitable entertainment device is the Sony® PlayStation 4® device.

Figure 1:
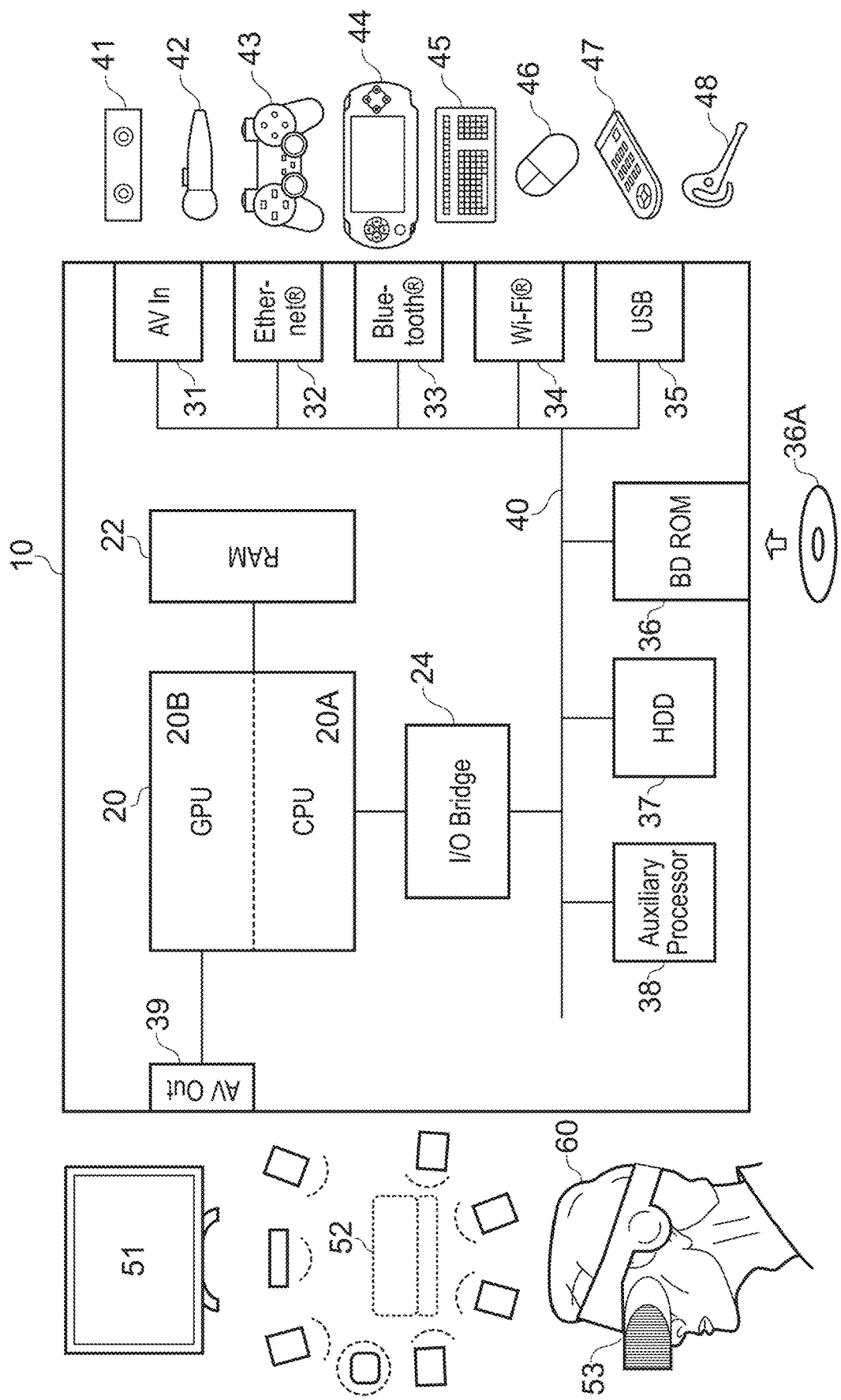
FIG. 1 is a schematic diagram of an entertainment device in accordance with embodiments of the present invention.

FIG. 1 schematically illustrates the overall system architecture of the Sony® PlayStation 4@ entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye® or PS Camera®; wand-style videogame controllers 42 such as the PlayStation Move @ and conventional handheld videogame controllers 43 such as the DualShock 4 ®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a phone or tablet, printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60. The head mounted display unit may have integral headphones, attachable headphones/earbuds, or rely on separate audio being supplied to the user.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

3D Printer

As was noted previously, the entertainment device is operably coupled to a 3D printer.

It will be appreciated that there are numerous technologies for 3D printing that are typically differentiated by how layers are built up to create a model. One technology is known as selective laser sintering (SLS), where a layer of powder is selectively fused together by a laser to create solid regions; a new layer of powder is then placed on top and the process repeats to build the model. Another technology is known as stereolithography, and uses a photo-reactive liquid in conjunction with one or more lasers to harden the liquid at defined points, thereby building the model, again typically in layers. Whilst both of these techniques are envisaged within the scope of embodiments of the present invention, they have the disadvantage of requiring both powerful lasers and large volumes of matrix material in the form of powder or liquid around the model, which make them less practical for domestic use. Consequently a preferred technology is fused deposition modelling (FDM). This approach melts plastic in a printer head that moves over successive layers of the model, depositing droplets of plastic at selective positions in each layer in a manner similar to the deposition of droplets of ink by an inkjet printer on a sheet of paper. This avoids the need for lasers or a surrounding matrix of the raw material used by the model. Accordingly for the purposes of understanding an FDM 3D printer is briefly described herein with reference to FIGS. 2A and 2B.

Figure 2A:
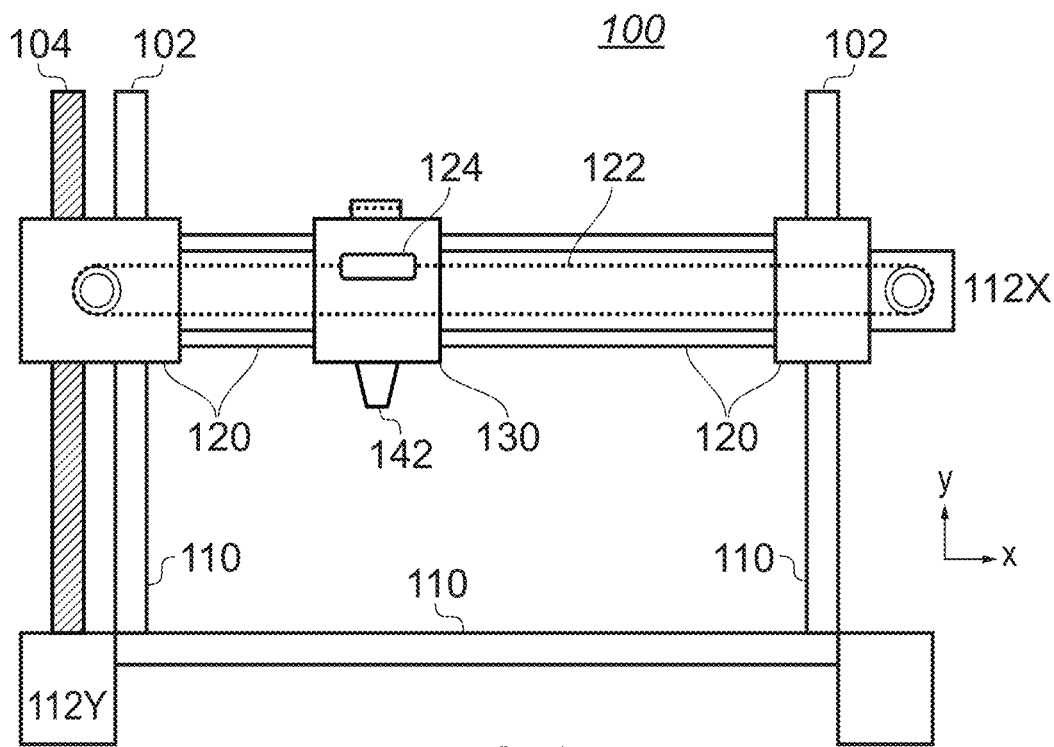
FIG. 2A is schematic diagram of a side elevation of a 3D printer in accordance with embodiments of the present invention.
Figure 2B:
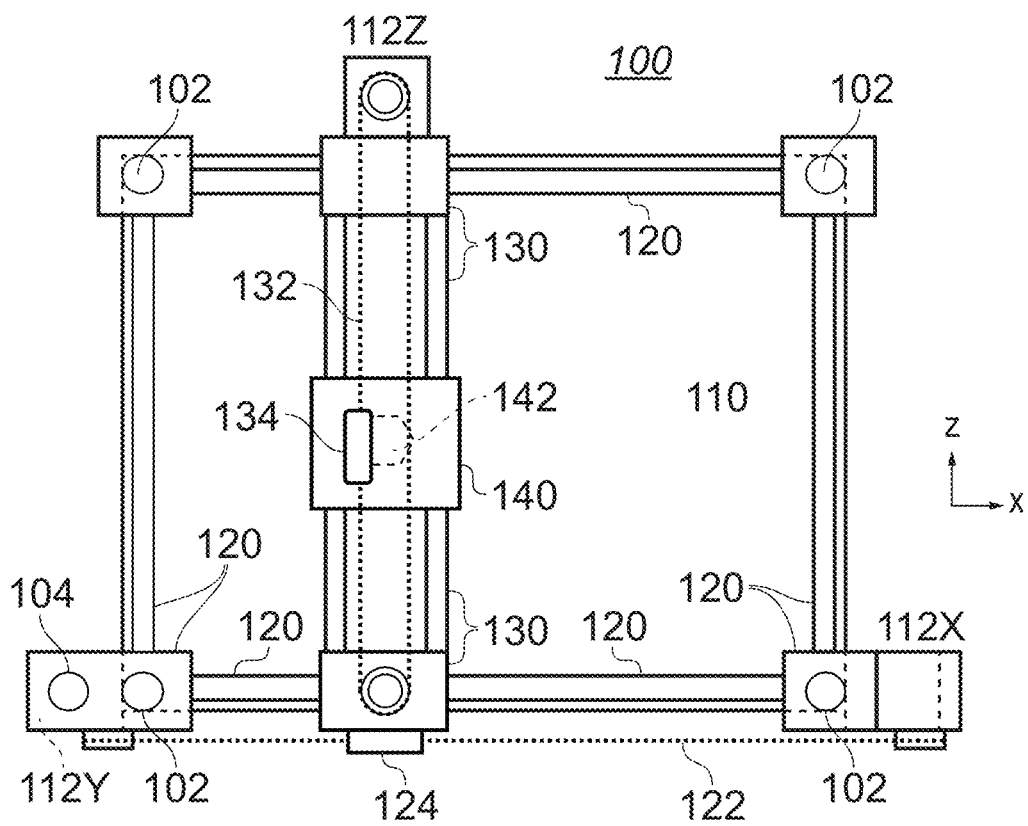
FIG. 2B is schematic diagram of a plan view of a 3D printer in accordance with embodiments of the present invention.

FIG. 2A shows a side elevation of a simple FDM 3D printer 100, whilst FIG. 2B shows a plan view of the same FDM 3D printer. The printer 100 comprises a base structure 110 that provides a working surface for assembly of the printed model and support struts 102 upon which a printer frame 120 can be raised and lowered.

In an example mechanism, a motor 112Y is coupled to a drive bar 104 comprising a screw thread; a printer frame 120 then comprises a coupling section with a threaded hole and a smooth hole, the threaded hole being engaged with the drive bar and the smooth hole being engaged with one of the support struts. When, under instruction from a printer driver, the motor 112Y turns the drive bar in a clockwise or anticlockwise direction, the printer frame is moved up or down the drive bar and support strut (i.e. along the y-axis) and hence raises or lowers a printer carriage 130 attached to it.

As can be seen from FIG. 2B, the printer frame 120 is typically mounted on four support struts 102. Optionally a second motor, drive bar and coupling section may be provided at an opposing corner of the frame, to reduce strain on the frame and the motor.

The printer frame 120 supports the printer carriage 130. A motor 112X is coupled to a drive band 122 that is fixed by fixing means 124 to the printer carriage 130. When, under instruction from a printer driver, the motor 112X rotates the drive band clockwise or anticlockwise, the printer carriage 130 is moved right or left along the printer frame 120 (i.e. along the x-axis) and hence moves an attached printer mechanism 140 laterally.

The printer carriage 130 supports the printer mechanism 140. A motor 112Z is coupled to a drive band 132 that is fixed by fixing means 134 to the printer mechanism 140. When, under instruction from a printer driver, the motor 112Z rotates the drive band clockwise or anticlockwise, the printer mechanism 140 is moved in or out of a depth direction (i.e. along the z-axis).

The printer mechanism 140 itself comprises heating means for heating the end of one or more plastic threads fed into the mechanism (not shown), or for heating grains of plastic powder obtained from a hopper on the mechanism (not shown). The heating of the plastic or alternatively the release of heated plastic is controlled by instruction from a printer driver. A resulting bead or droplet of melted plastic is then deposited onto the working surface 110 of the printer or a partially built model (not shown) as applicable, through the printer head or nozzle 142.

In this way, under suitable instruction from a printer driver, the printer head can be positioned anywhere within a working volume of the 3D printer using motors 112X, Y, Z, and a droplet of plastic can be deposited at that position, which then cools and hardens to form a voxel of a 3D model. Through successive movement of the printer head and selective melting or release of plastic droplets, a completed 3D model can thus be built from a plurality of such voxels.

Typically the printer driver itself is a software module in a computer-aided design system that receives model geometry describing the 3D model. The printer driver then generates thin slices of the 3D model one voxel thick for each layer in the y direction, and determines the x, z coordinates for each voxel in that layer. The printer driver then outputs a sequence of instructions to the printer 100 to move the printer head 142 to the respective x, z coordinate for each voxel in layer y, where the printer mechanism is instructed to heat and/or release a droplet of plastic to form a voxel at that position. In this way the digital 3D model is rebuilt as a physical model by the 3D printer.

In an embodiment of the present invention, the printer driver is incorporated into the videogame, or the operating system of the entertainment device, or a middleware library of support functions used by either the videogame or the operating system.

Virtual Environment

Figure 3:
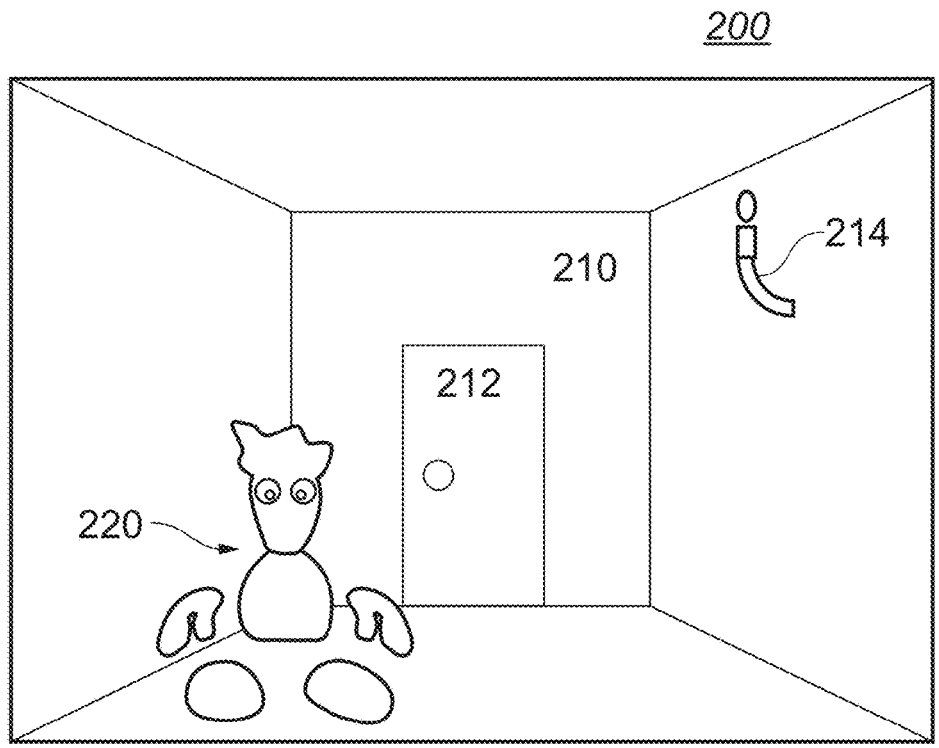
FIG. 3 is a schematic diagram of a videogame virtual environment in accordance with embodiments of the present invention.

Referring now to FIG. 3, a videogame running on the entertainment device comprises a virtual environment in which typically a plurality of entities or environmental elements are dynamically viewed as the user changes the position of viewpoint and as entities or elements of the game enact scripted activities or react to the user's behaviour, or a mixture of both.

In FIG. 3, a simple environment 200 is illustrated comprising a room 210 with a door 212; on one wall there is mounted a candle in a candleholder 214. In the room is the player's character 220 (here illustrated for example by the fictitious game character Blobman).

The virtual environment is constructed in 3D from geometry data, typically in the form of polygons defining a surface of an object. These polygons may be predefined for example in the case of static objects and background scenery, or may be warped/repositioned or procedurally generated in the case of mobile entities within the environment such as the player's character. It will be appreciated that references herein to 'polygons' encompasses preliminary geometrical features such as vertices, from which polygons are built, where these are used in the graphics pipeline. Similarly, voxel rendering uses equivalent geometric features to describe objects. Hence processes described as applying to polygons may be applied in whole or part to such other geometrical features as appropriate.

The virtual environment is then prepared for presentation to the user from a selected viewpoint. Elements of the environment that have line of sight to the user are patterned with texture information appropriate to the object they represent, and the textured geometry is further processed for lighting effects, such as variations in brightness from virtual light sources, and bump mapping (or similar techniques such as displacement mapping or use of an isosurface) to simulate how the texture should interact with such a virtual light source. Additionally other effects such as volumetric fog and particle effects may be included.

The final rendered image is then presented to the user, typically via a 2D or 3D television or via a head mounted display.

Often within such games, the user has an experience that they wish to share with friends and/or the wider world. To this end, as noted previously an entertainment device such as the PlayStation 4 ® can have a 'share' button on its controller to facilitate a capture of the image presented to the user, which can then be uploaded to a sharing site such as a social media site.

Printing a 3D model of the environment from a collection of images In an embodiment of the present invention, the user is provided with the option to select a moment within the game from which to create a 3D printed model. In this way, the user can create tangible mementos of their in-game experiences.

In an embodiment of the present invention, when the entertainment device receives an input indicating that a user wishes to create a 3D print of the current scene, the game state is frozen (e.g. paused) so that it can be analysed for 3D printing.

It will be appreciated that for a game, many visible features are not inherent in the in-game geometry or textures of a model alone. For example the in-game geometry, which may be a mix of polygons and skeletal models, may have physics effects such as positioning and deformation applied from frame to frame. Other rendering effects like procedural effects and parametrised models may be done in shaders during rendering. Meanwhile shaders may also visually process textures according to bump maps and the like. Consequently often the final scene—as viewed by the user—is only combined in one place, and in one format, when it is rendered for display on screen.

Consequently, in an embodiment of the present invention, a 3D model is constructed for 3D printing using these rendered images in preference to the potentially disparate internal in-game representations of the virtual environment geometry. Such a technique may be referred to as virtual photogrammetry. However, a single rendered image will typically comprise insufficient information to fully model the virtual environment for 3D printing.

As was noted previously herein, during normal play the virtual environment is rendered for a particular viewpoint. Furthermore to enable high frame rates and efficient processing, then as part of this rendering process elements of the environment that are not visible from that particular viewpoint are culled early in the rendering process.

Consequently only the elements of the environment visible from the selected viewpoint are preserved and rendered. If one were to generate a 3D printer model of the environment using this render, then all aspects of the model that were not visible from that particular viewpoint would be missing or would have to be filled in using some form of interpolation algorithm. Clearly this would give rise to unsatisfactory results when the real printed model was viewed from any other angle.

Accordingly, in an embodiment of the present invention, while the game state is frozen the entertainment device generates a plurality of rendered images of the virtual environment from different viewpoints.

Preferably at least two opposing viewpoints are rendered, with the first viewpoint typically being the one originally displayed to the user. Between the two images, this results in the rendering of most if not all of the elements of the environment culled in the original rendered view.

Optionally three viewpoints are rendered, preferably equally distributed on a plane, with the first viewpoint being the one originally displayed to the user and the plane being horizontally centred on the direction of view of that first viewpoint. Again this results in the rendering of most if not all of the elements of the environment culled in the original rendered view, but is likely to capture more elements of the environment that may have been occluded by objects both in front and behind them and hence not rendered in either of the two viewpoints mentioned above.

More generally, as more viewpoints are distributed on the plane, fewer elements of the environment remain un-rendered. For example, the entertainment device may conduct a 'fly-by' within the environment, capturing N images, where N is for example between 2 and 360. The number of images captured is a trade-off between fidelity of the eventual model and the memory and processing capacity of the entertainment device needed to analyse the captured images (as discussed later herein).

Optionally, one or more viewpoints looking down from above the virtual environment may also be rendered (either as individual images or as part of a flyby sequence) to provide additional detail for those elements of the environment that are substantially parallel to the previously captured viewpoints on a single plane, such as the top surfaces of some environmental features.

In an embodiment of the present invention, metadata relating to the position and viewing direction of the virtual camera representing the viewpoint for each image is also recorded and associated with the respective image.

It will be appreciated that the virtual environment may represent a large area, whereas the 3D model will encompass a limited area determined by the size of models that can be generated by a particular 3D printer and the scale at which the environment is printed. Preferably the properties of the particular 3D printer are known if it is in communication with the entertainment device (otherwise, a default model size may be assumed or the user may stipulate a size); similarly the scale at which the environment is printed may be selected by the user or may be automatically determined with reference to a key character within the environment, such as the user's avatar. This avatar may be chosen to be a particular size within the final 3D printer model (as a non-limiting example, 5 cm tall by default), and the extent of the environment to be printed at the same scale may thus be calculated. Alternatively, in a 'character print' mode, only a particular character, such as the user's avatar, may be printed, without surrounding in-game environmental features. This may be of particular value for cases where the user is allowed to customise their own in-game character, and becomes emotionally attached to it.

The equidistant distribution of two or more viewpoints may thus be centred on this key character, and may optionally use any in-game camera control logic to determine the necessary direction of view needed to centre the key character within each captured image.

Where the game presents a first-person view, then based upon the model size and an assumed or user-set scale, the centre point of the model can be calculated and the viewpoints can be distributed around it.

Combining the above approaches, the entertainment device may capture images by selecting sample points on a sphere of predetermined radius, and which is centred on that centre point. Optionally those sample points that are occluded by an environmental barrier (such as a point on the sphere below the ground or inside a mountain) may either be skipped, or the radius of the sphere may be locally reduced until the surface is no longer occluded by the environmental barrier. Alternatively, elements of the environment that are not part of a target object that is to be 3D printed may be omitted from the render to provide an unobstructed view (selection of a target object from the wider virtual environment is described later herein). The sampling scheme may initially select viewpoints on the above mentioned plane comprising the original viewpoint and centre point and parallel to the horizontal axis of the original viewpoint, before optionally selecting one or more viewpoints on the sphere above this plane, and optionally one or more viewpoints on the sphere below this plane. The predetermined radius may be equal to the distance between the original viewpoint and the determined centre point of the model, to maintain consistency with the original captured image, or the original image and the subsequent additional image(s) may be re-rendered at a different effective radius, for example a minimum radius at which the field of view of the image encompasses the ground area that will be included in the 3D printed model. Notably, traditionally games use lower-fidelity models at greater draw distances to simplify the rendering process. Therefore optionally the radius may be constrained to a maximum distance equal to a rendering distance at which the game would select a lower-fidelity model of a key element of the image (such as the user's avatar). Further optionally, this may be overridden by a user for aesthetic purposes or because they wish to ensure that a particular environmental feature or combination of features is included in the final model. This may be of particular value for cases where the user is allowed to customise the environment, for example by creating so-called 'mods'.

In any event, the result is a set of images capturing two or more complimentary viewpoints of the virtual environment for a given game state.

It will be appreciated that the above image capture procedure may be controlled by the entertainment device. However, alternatively or in addition the user may capture images of the same scene from one or more different viewpoints by selecting these viewpoints themselves and using a conventional image capture process. These viewpoints may not correspond to the preferred distributions discussed previously herein. It will similarly be appreciated that images of the same scene from different viewpoints can be captured by different users at different times on different entertainment devices; providing a user has access to a pooled set of images (for example if they are posted to an online forum, or are stills extracted from a 'fly-by' video that moves or changes viewpoints, such as may be included in a trailer video for the videogame) then an equivalent set of two or more complementary viewpoints of the virtual environment may be obtained.

Given these images and optionally associated metadata relating to the viewpoint position and direction, an entertainment device can go on to analyse these images to generate 3D model data.

Several analysis techniques may be used, optionally in a complementary manner.

Silhouette analysis uses the edges of objects within the captured images to estimate the object's profile local to that edge. The object profile can then be extruded orthogonal to the profile for each viewpoint until it intersects with another extruded profile (typically extruded from another viewpoint), to create an approximation of the object's shape. It will be appreciated that as the number of viewpoints increases according to the scheme described previously herein, each extrusion will subtend a smaller angle around the object, resulting in a more accurate overall model of the object.

Stereoscopic analysis uses the relative displacement of the same objects within two overlapping viewpoints to calculate their distance from the or each viewpoint. From this information, a depth map can be constructed that is indicative of the 3D shape of the object in the region visible to both viewpoints. Hence again where more viewpoints are available, successive pairs of viewpoints can be used to build a map of the surface of a viewed object.

In either case, where there is no viewpoint information, this may be estimated by correlating environmental features between images, and selecting viewpoint positions and directions that provide the best correlation for the relative positions of these features.

It will be appreciated that silhouette analysis and stereoscopic analysis can be used to complement each other. For example the two techniques can be used to detect errors in each other's models; where the two techniques generate estimates of an object surface that differ by a threshold amount, the estimate that most closely matches an interpolation between nearby estimates of the object surface from the two techniques that are within a threshold agreement may be used, with the other estimate being discarded. Optionally, such areas of the model may also be highlighted for inspection and/or editing by the user prior to printing, as discussed later herein.

The above techniques are particularly useful where the image data is obtained from third parties (for example from screenshots on a forum), and there is no additional metadata available.

However, in the case of images generated and captured by the entertainment device, it is preferable to also capture associated depth information generated by the entertainment device itself. As was noted previously, during a conventional render of a viewpoint, elements of the environment that are occluded from the rendered view are culled. This occlusion is determined, at least in part, by the relative distance of objects in the environment from the virtual camera; for example objects that are behind other objects are deemed to be occluded and thus culled. These distances are calculated by the entertainment device for this purpose. This means that there is an accurate and per-pixel (or even sub-pixel) resolution distance or 'depth' map available for each captured image.

In an embodiment of the present invention, this depth map is also captured and associated with each image captured by the entertainment device for use in the generation of the 3D model. In principle, this information can be obtained in a manner that is transparent to the operation of the renderer by copying the so-called z-buffer used when generating the image. Consequently the image capture process does not require modification of a game rendering engine.

More generally, it will be appreciated that any suitable technique for identifying the surface position of a rendered pixel within each captured image can be made with respect to a 3D origin (or example an origin within the game world or an origin for the render of the target object in isolation), thereby generating a consistent representation of the pixel over potentially multiple renders.

Figure 4:
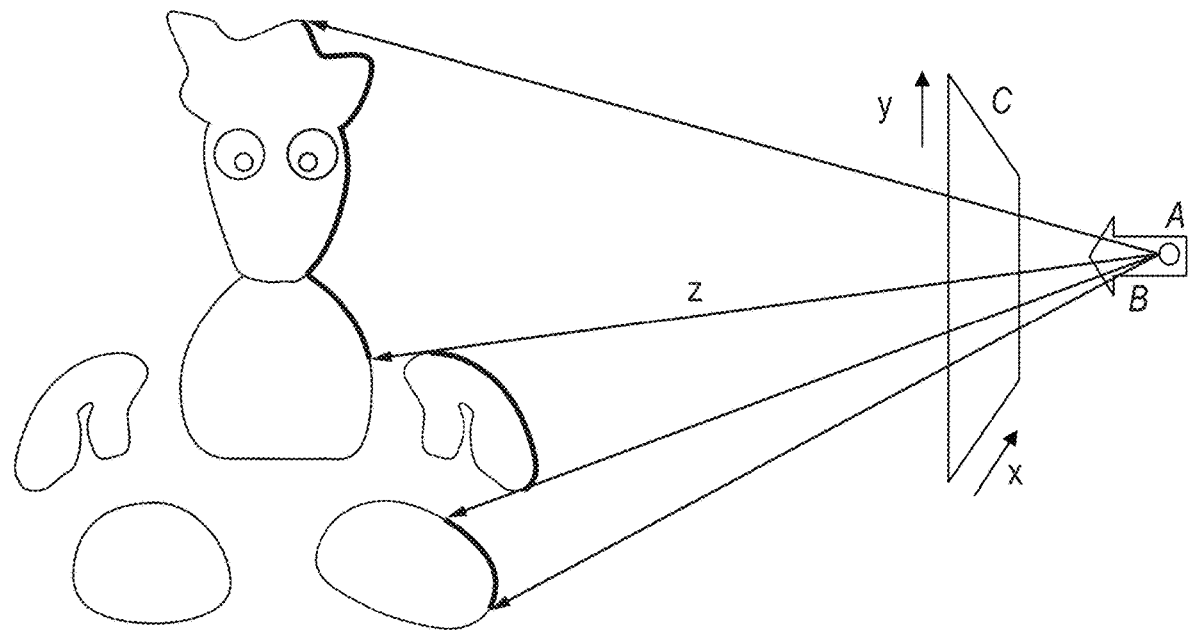
FIG. 4 is a schematic diagram of a projection in to a 3D model space in accordance with embodiments of the present invention.

Referring now to FIG. 4, given information regarding the position A and viewpoint direction B of each image, together with the associated distance information z, the pixels of each image can be projected to respective points within a shared virtual modelling space 300, for example based on a common origin. In effect, each pixel is displaced from the position A of the image viewpoint by amount x,y,z in a co-ordinate scheme local to the image (but which may be rotated to a co-ordinate scheme common to the shared virtual modelling space, using known techniques). Here, x and y are the pixel co-ordinates in the captured image (represented by notional screen C), and z is the associated depth or distance value for that pixel from the camera position A. Only one column of pixels (i.e. for a single value of x) have been projected in FIG. 4 for clarity, but it will be appreciated that any number of pixels of the image can be projected in this manner; for example, those corresponding to the target object.

The result is that pixels from each image will be positioned within the shared virtual modelling space at their correct position in 3D on the surface of a virtual object in the scene, as illustrated in FIG. 4 using the example of Blobman. As each image is projected into the shared virtual modelling space, more of the surface of each object in the scene will be 'painted-in' in this manner. Where two images project the same pixel onto the same point in 3D space, the second projected pixel may be discarded or may replace the first pixel, or an average value may be generated.

It will be appreciated that pixels are two dimensional objects. Consequently in an embodiment of the present invention, when a pixel from an image is projected to a position $x_i$, $y_j$, $z_k$ in the shared virtual modelling space, in fact a voxel (a typically cubic 3-dimensional pixel) is created at that position, and the colour information associated with the projected pixel is used as the colour information for the voxel.

The effect is that a shell of voxels representing the visible surface of the virtual environment is built up by projecting the colour data of the image pixels in each image to x,y,z positions in the shared virtual modelling space.

It will be appreciated that instead of projecting plural images into a shared modelling space using the z-buffer depth information from the entertainment device, this depth information may be estimated using the previously discussed techniques of stereoscopic depth estimation and/or silhouette analysis and surface extrusion. Hence these techniques may also be used to drive the assembly of a voxel shell within a shared model space in the above described manner.

In any event, once all the images have been used, the resulting shell of voxels can be analysed for integrity. Any gaps in a surface (optionally below a threshold size) may be filled in by interpolation from the surrounding surface.

Having generated an estimate of the 3D shape of the environment in the form of the voxel shell, a 3D model can be generated for printing.

Figure 5:
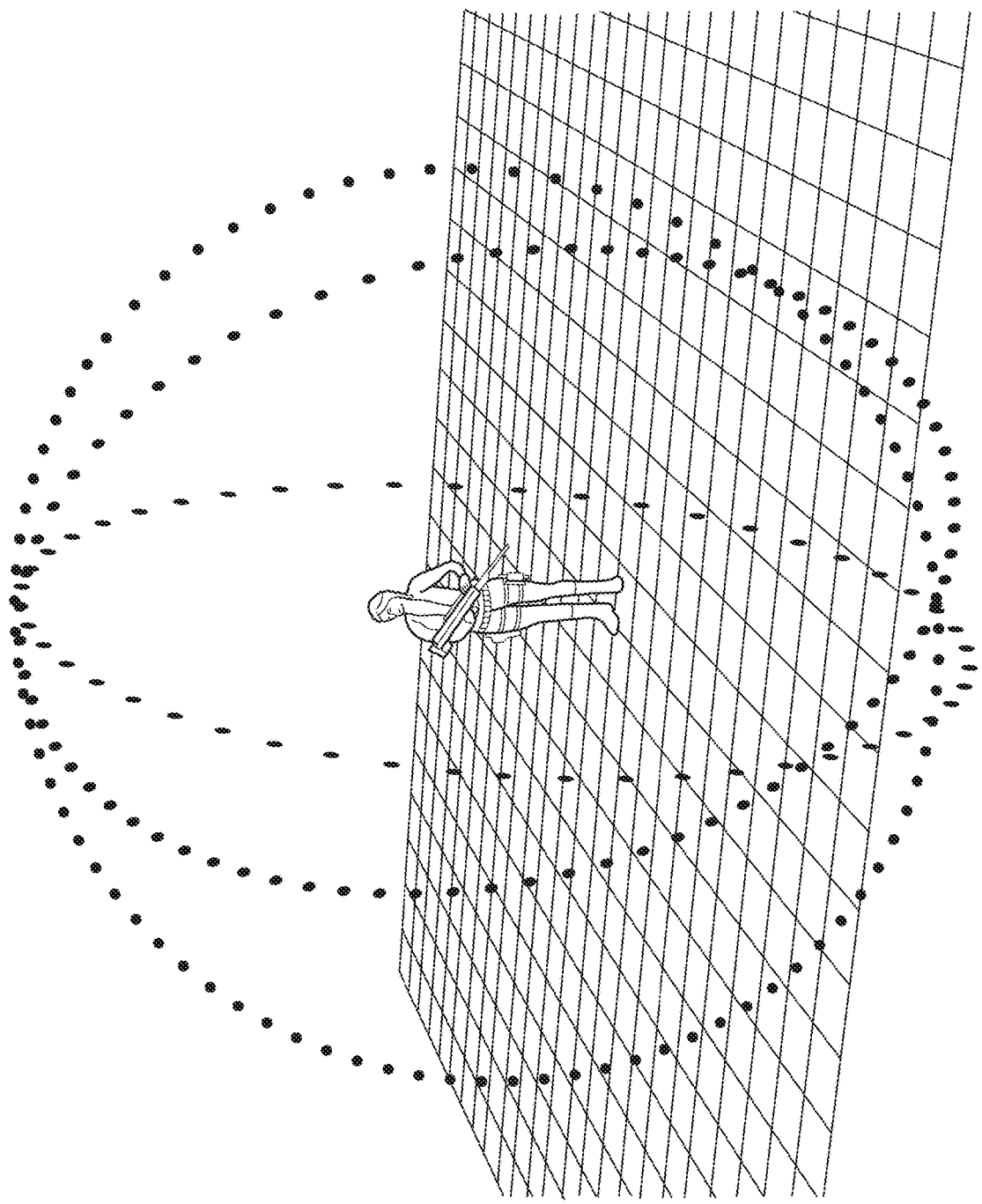
FIG. 5 is a schematic diagram of default virtual camera positions for a virtual photogrammetry process in accordance with embodiments of the present invention.

Determining and Improving Model Integrity Referring now to FIG. 5, in an embodiment of the present invention a target object (such as the illustrated character 520) is rendered from a plurality of viewpoints. Whilst previously it was suggested that at a minimum two images may be used, or only a few, in practice considerably more may be used in order to provide good coverage of the target object(s). Hence in FIG. 5, as a non-limiting example eighty renders are generated for each of three circular orbits of the character by a virtual camera, each orbit being equidistant about a circle orthogonal to the orbits themselves. It will be appreciated that the number of orbits and the number of renders per orbit are purely exemplary and any suitable combination of renders and orbits (or partial orbits, e.g. semicircular above a base height of the target object) may be considered, or distributions other than orbits (such as a distribution of camera positions over the effective surface of a sphere, either uniform or non-uniform, for example with additional camera positions near the position of the in-game camera when the original indication to capture the object was made). At the same time, for each render optionally depth (distance) data for each rendered pixel from the virtual camera position is also recorded, so that the position of each rendered pixel in the rendering space can be determined from the render, the depth information, and the camera position.

It will be appreciated that any scheme that results in sufficient viewpoints being provided may be appropriate; hence as an alternative to three orbiting virtual cameras, a constellation of (for example 80) stationary virtual cameras may be used. Similarly in either case the target object may be static or may itself be rotated in one or more axes, for example to provide each of a smaller constellation of cameras with several neighbouring views, effectively compensating for missing cameras at different viewpoints in a larger constellation.

The resulting N images (in this example 240) are provided as input to a known photogrammetry technique, for example as described previously.

Figure 6A:
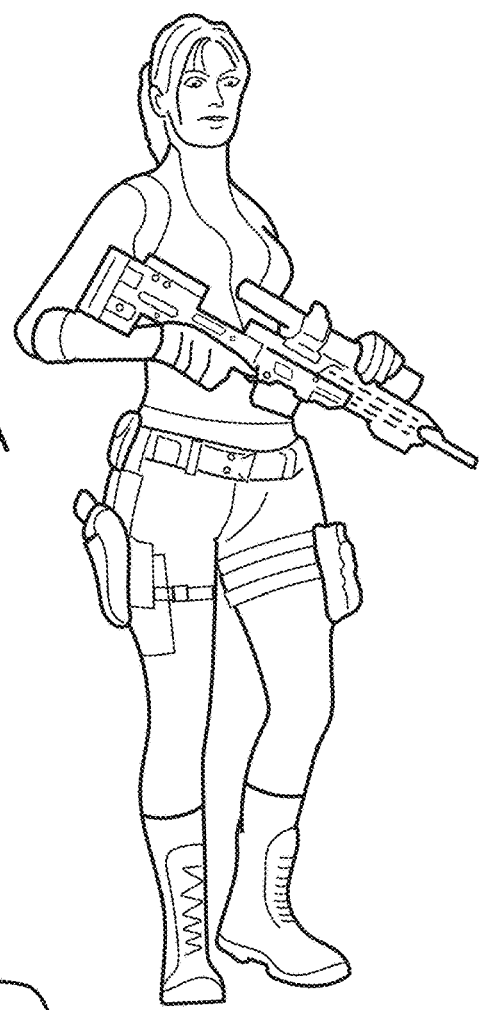
FIGS. 6A and 6B are illustrations of a 3D model generated by a virtual photogrammetry process based upon renders from the default virtual camera positions.
Figure 6B:

An example output of this technique is shown in FIGS. 6A and 6B. FIG. 6A shows a model of the character derived using virtual photogrammetry, and superficially it appears to be accurate. However, as can be seen from FIG. 6B, as highlighted by the oval ring, regions of the character's torso occluded primarily by the gun have not been modelled accurately, causing regions of the model to be fused or distorted.

Clearly a user having printed such a model would be disappointed with the quality of the result.

Figure 7:
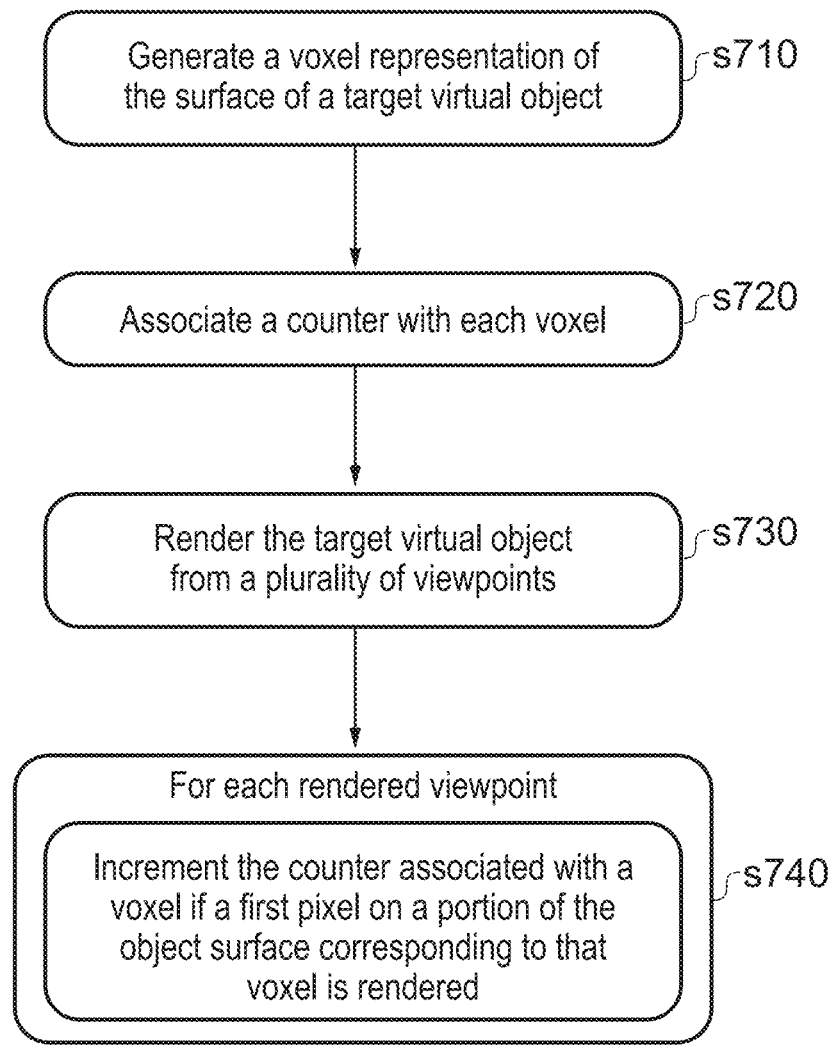
FIG. 7 is a flow diagram of a method of 3D print modelling in accordance with embodiments of the present invention.

Accordingly, and referring now also to FIG. 7, in an embodiment of the present invention a method of 3D print modelling comprises in a first step s710, generating a voxel representation of the surface of a target virtual object.

Figure 8A:
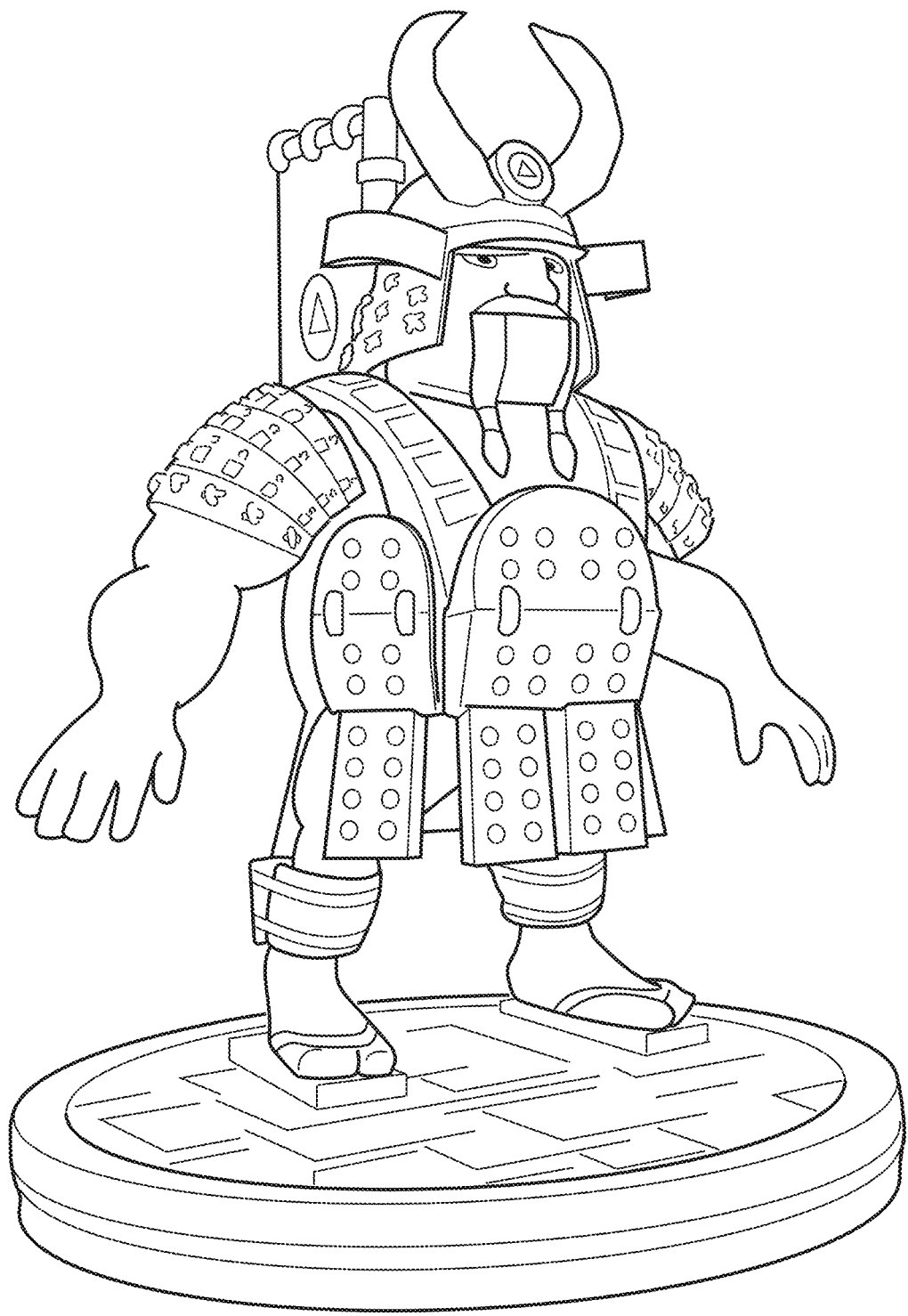
FIG. 8A is an image of a target object in accordance with embodiments of the present invention.
Figure 8B:
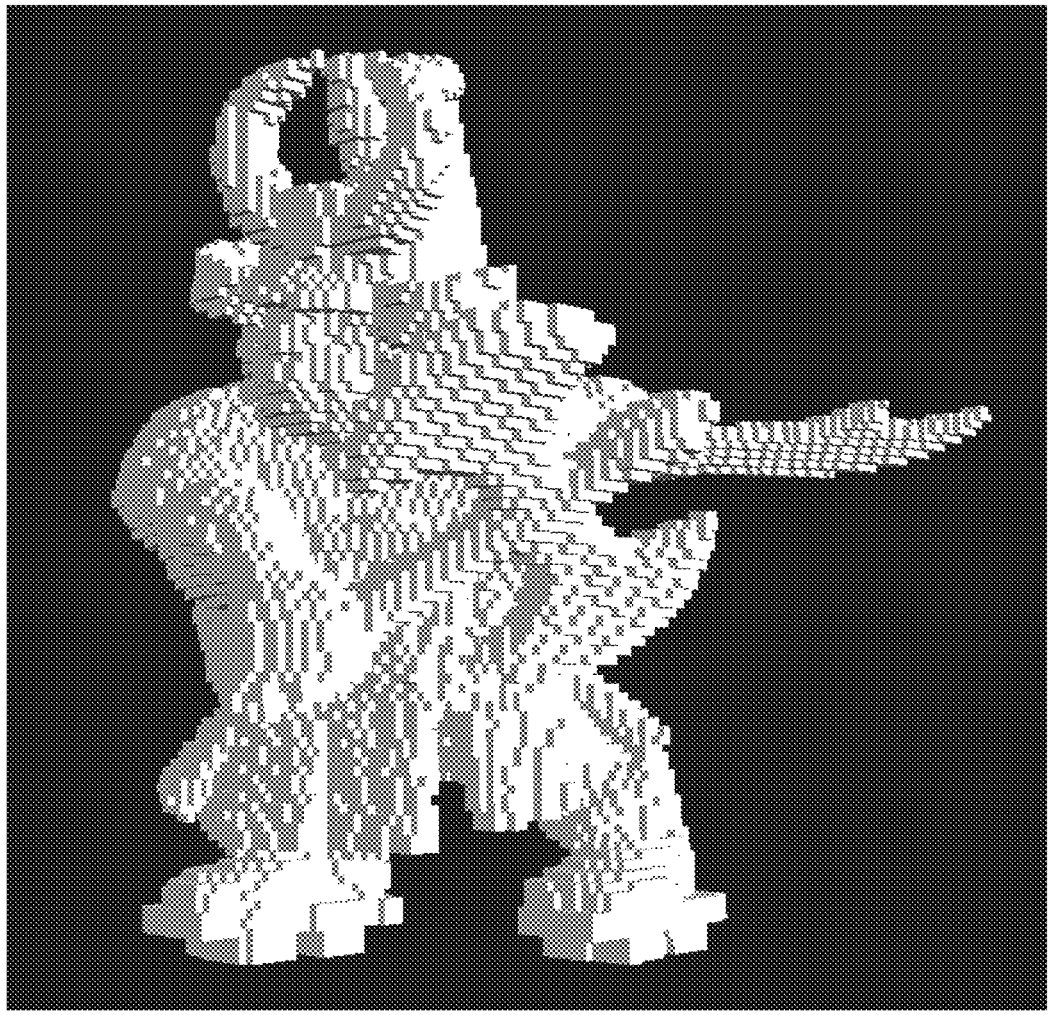
FIG. 8B is an image of a voxel model of the surface of the target object, in accordance with embodiments of the present invention.

It will be appreciated that having frozen the virtual environment/target object for the purpose of multiple renders, the actual object model remains static during the virtual photogrammetry process. Consequently it is possible to generate a separate and persistent representation of the model to track the progress of data gathering by each successive render. Referring now to FIGS. 8A and 8B, for the example case of a samurai character as rendered in FIG. 8A, a representation of that character can be generated as shown in FIG. 8B (in this case in a slightly different pose, about to swing an axe).

The separate and persistent representation is a voxel model of the surface of the target object(s) to be printed. As can be seen from a comparison of FIGS. 8A and 8B, typically the voxel resolution is lower than the render resolution, so that plural pixels in a rendered surface will map to a corresponding voxel in the voxel model.

The voxel resolution may optionally be selected to correspond to the voxel resolution of the 3D printer that is to be used. Hence for example if the 3D printer has a voxel resolution of 1 mm$^3$, and the printed model will be 10 cm high, then the voxel model will be 100 voxels high. It will be appreciated that whilst it is preferable to use a voxel resolution at least the same or higher than the 3D printer, this is not essential.

The voxel model can be generated using model data extracted during the rendering process, or can be rendered separately using the same target object model data.

In a second step s720, a counter is associated with each voxel. This counter is used to tally how many rendered images include a pixel from the portion of the target object(s) corresponding to that voxel, as will be explained later herein. Hence the voxels in conjunction with their counters form a voxel histogram of how many times each surface region corresponding to a voxel gets rendered during the photogrammetry process. This counter may thus be thought of as the main histogram counter for a voxel.

In a third step s730, the target virtual object(s) are rendered from a plurality of viewpoints as described previously, for example with reference to FIG. 5.

Then for each rendered viewpoint, in a fourth step s740, the main histogram counter associated with a voxel is incremented if a first pixel on a portion of the object surface corresponding to that voxel is rendered.

As was noted previously, typically the voxel resolution is lower than the rendered pixel resolution, meaning that potentially multiple (and variable) numbers of pixels may map to a corresponding voxel in any given render. Consequently the total number of pixels corresponding to a voxel in a render would be uninformative, and this would be compounded if the count accumulated over multiple renders.

Rather, it can be assumed that the first pixel in the render that maps back to a voxel can be taken as indicative that the region of the model corresponding to the voxel is appropriately visibly represented in that render.

A simple way to implement this check approach is to further associate a flag with each voxel, which is reset to a first state (e.g. to inactive, low, or 0, depending on convention) for each render. Subsequently, the counter of a voxel is only incremented if the previously described condition of rendering a pixel on a portion of the object surface corresponding to that voxel is met, together with the condition that its associated flag is in the first state. Then, if the main histogram counter is incremented, the flag is also switched to a second state (e.g. active, high, or 1, depending on convention).

By flipping the flag to a different state if the main histogram counter is incremented, and only incrementing that counter if the flag is in the default initial state, then the main histogram counter can only be incremented once per render, i.e. in response the first rendered pixel detected to be in the region of the target object(s)' surface corresponding to that voxel.

It will be appreciated that in principle different counting strategies could be used in addition to or instead of a flag scheme. For example optionally a parallel counter could be provided for each voxel that counts up to M (where for example, M is a number corresponding to a fraction of the pixels that in principle map to a voxel) when a pixel corresponding to that voxel appears in a render.

Hence for example in the previous case of 1 mm$^3$ voxels for a 10 cm model, resulting in a voxel representation 100 voxels high, then if the rendered object is 1000 pixels high one can infer that potentially 100 pixels (10×10 pixels) could map onto a voxel, for example if viewed face on and without occlusion.

Hence for ½ of the pixels, the parallel counter would count to M=50. Meanwhile for 1/25 of the pixels, the parallel counter would count to M=4. In this case, the main histogram counter may only increment if the parallel counter reached the selected M threshold value. This would indicate that a non-trivial proportion of the pixels corresponding to that voxel had been rendered in a given view. The proportion may for example by anywhere in the range 100% to 1%, but more typically would be in the range 50%-1%, more typically still in the range 25%-2%, more typically still in the range 15%-3%, and more typically still in the range 10%-4%.

Similarly optionally, a parallel counter may be provided that counts up to P, where P is again a proportion of the possible pixels that may be rendered. At the end of the analysis of a given render, the final value in the parallel counter is added to the main histogram counter. This would enable a reflection of the different amounts of pixels being rendered for each voxel in a view, whilst limiting the degree of disparity between histogram values (continuing with the above example, if the fraction was 1/10, so that P=10, then a voxel that had 100 corresponding pixels rendered would only add 10 to its histogram, whilst a voxel that had 5 corresponding pixels rendered would add all 5 to its histogram. Over time it would still be clear what areas of the model were better represented than others, but without value disparities potentially amounting to plural orders of magnitude, which could make subsequent processing difficult.

Hence in this case, the method would comprise associating each voxel with a second counter that is limited to a predetermined maximum count value, and the step of incrementing the main histogram counter would comprise incrementing the second counter associated with a voxel, subject to the predetermined maximum count value, if a pixel on a portion of the object surface corresponding to that voxel is rendered, and then subsequently incrementing the main histogram counter by the final value of the second counter.

Referring again to FIGS. 5 and 8B, once all the renders at the predetermined camera positions have been completed and the relevant data for photogrammetry has been accumulated, the main histogram counters of the separate voxel model will have values indicative of how often (or optionally, indicative of how completely) the corresponding regions of the target object were rendered over all the different camera positions.

Figure 9:
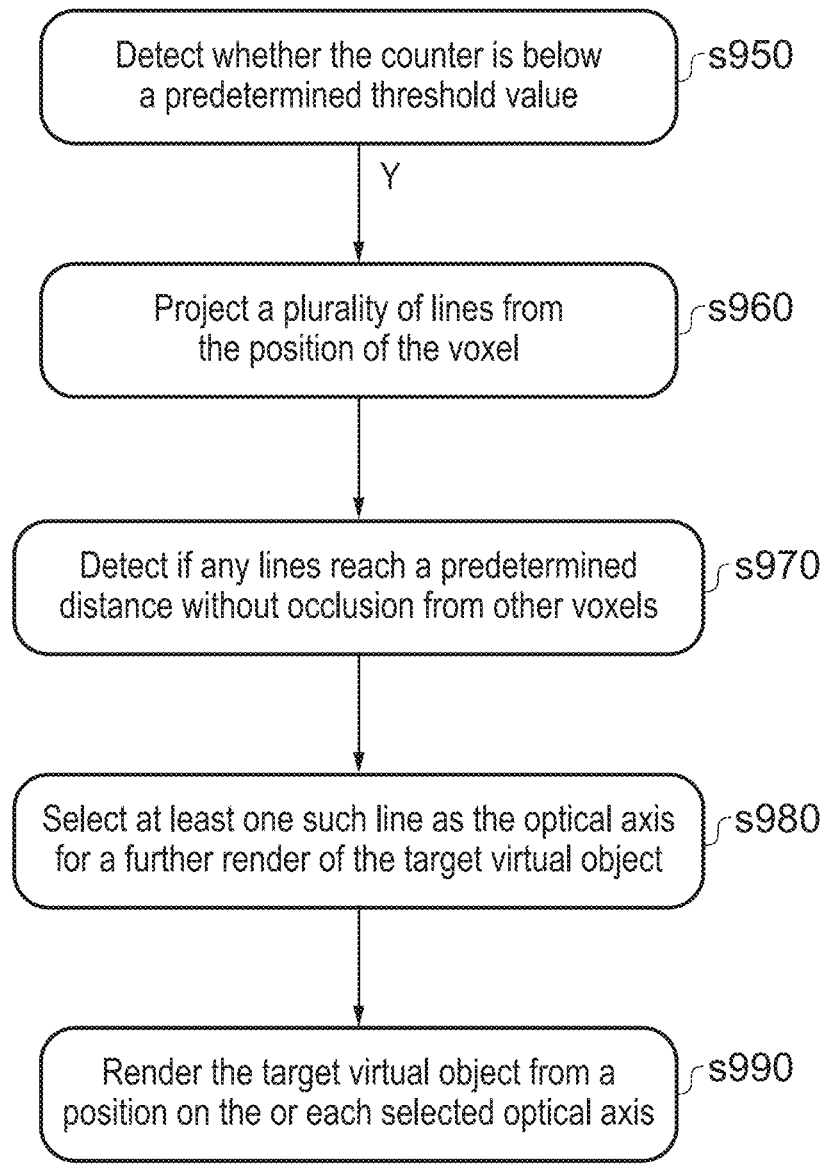
FIG. 9 is a flow diagram of the method of 3D print modelling in accordance with embodiments of the present invention.

Then, referring now to FIG. 9, in an embodiment of the present invention, the method of 3D print modelling proceeds as follows for each voxel:

In a fifth step s950, the counter is compared with a predetermined threshold value to detect whether it is below that value. If it is above the threshold value, then it is assumed that the region of the target object(s) corresponding to that voxel has been imaged sufficiently often to provide a good input to the photogrammetry process, which can proceed as described previously in order to generate a 3D surface geometry (and optionally but preferably also associated textures). The generate 3D surface geometry may be in the form of polygons, a point cloud, a high resolution voxel shell or any suitable representation for subsequent processing as describer later herein.

However, if the counter is below the threshold value, then it is assumed that the region of the target object(s) corresponding to that voxel has not been imaged sufficiently often to provide a good input to the photogrammetry process, and therefore at least one additional render is needed. For example Q-R renders may be sought, where Q is the predetermined threshold value and R is the actual value of the main histogram counter for that voxel. Alternatively, only one additional render may be sought.

To obtain this render, in a sixth step s960 a plurality of lines is projected from the position of the voxel (for example 16, 32, 64, 128, 256 lines equidistantly radiating from the centre or surface of the voxel). These lines can be thought of as candidate directions of view for a virtual camera that are guaranteed to intersect with the region of the target object(s) corresponding to the voxel (when looking back down the lines toward the voxel position).

Then, a seventh step s970 comprises detecting if any lines reach a predetermined distance without occlusion from other voxels. For example with reference to FIG. 5, it can be detected whether any lines reach the surface of the sphere upon which the virtual camera is positioned without interruption/occlusion by other voxels.

It will be appreciated that the point of intersection of any line with that sphere represents a position at with the virtual camera may be placed in order to obtain a render that includes at least some of the region of the target object(s) corresponding to the voxel, if the camera looks along an equivalent line.

Hence in an eighth step s980, at least one such line (as transposed to the render space, if the render space uses different co-ordinates) is selected as the optical axis for a further render of the target virtual object(s), and in step s990 a render of the target object(s) along the or each selected optical axis is then generated.

Where a plurality of lines reach the predetermined distance without interruption, then optionally all of them may be used in this manner, or a predetermined number of them, or Q-R of them, or just one. Where a subset of available lines are used, optionally the lines are chosen to maximise the distance between the selected lines on the camera sphere, so as to obtain diverse viewpoints of the relevant region of the target model(s).

In this way, additional renders for capturing views of under-represented regions of the target model can be identified and obtained to improve the required coverage of the model for the purposes of photogrammetry.

Hence after his process has been completed for any voxels whose count is below the predetermined threshold, again the renders can provide a good input to the photogrammetry process, which can proceed as described previously in order to generate a 3D surface geometry (and optionally but preferably also associated textures). Again, the generated 3D surface geometry may be in the form of polygons, a point cloud, a high resolution voxel shell or any suitable representation for subsequent processing as describer later herein.

Hence whether additional renders are required or not, the direct product of the photogrammetry process is the 3D surface geometry of the target object (and optionally any associated textures. This 3D surface geometry (and optional textures) may be exported to a separate device for modification as described later herein, or saved, shared to a local or remote, private or public repository.

Meanwhile, if for a given voxel no lines reach the predetermined distance without occlusion from other voxels, then optionally the number of lines may be increased (for example from 128 to 256 lines), thus increasing the line density and the opportunity for a line to have an uninterrupted route. Such a process may continue until a maximum number of lines is reached (e.g. 512).

If no lines reach the predetermined distance without occlusion (optionally after increasing the number of lines) then the method may comprise a step of issuing a warning to a user that the resulting photogrammetry will be based on an incomplete view of the target object(s), and hence that a 3D printed model based on virtual photogrammetry of the rendered object may contain errors. The method may then terminate, offer the user the option of terminating, offer the user the option of proceeding, or proceed.

In particular, where the number of lines reached a maximum number without any line reaching the predetermined distance, this implies that the view of the model region corresponding to the voxel is very limited, and so any resulting distortion or error in the model in that region may have a minimal aesthetic impact.

Optionally, the user may be provided with one or more renders of the model overlaid with a so-called 'heat-map', which colour codes regions of the model based upon the histogram counter values of the corresponding voxel. This provides the user with a simple indication of the quality of the source data (e.g. the number of renders) for any given region of the render.

Similarly, after photogrammetry is complete, the resulting model may be rendered for the user, such that for example the user can control the viewpoint and inspect the model. Again optionally the resulting model may have a colour heat-map overlay provided that indicate to the user the quality of the source data (e.g. the number of renders) for any given region of the resulting model. This may assist the user in more closely inspecting regions of the model that may comprises errors, before committing to 3D printing the model.

Modifying the Model

It will be appreciated that the 3D surface geometry generated by the photogrammetry process, whether expressed in polygons, or as a point cloud or as a high resolution voxel shell, will have a negligible thickness corresponding either to a notional zero thickness, or a one pixel thickness or a one (high resolution) voxel thickness. In any event, when translated to a 3D printer, this is likely to be interpreted as one print voxel thick (e.g. using the above example, 1 mm thick). This is unlikely to be adequate in practice for any given model.

Accordingly, and treating the 3D surface geometry now as a shell of voxels to be printed, the shell can be extruded to a predetermined thickness. The extrusion may be performed by adding adjacent voxels to each surface voxel on the side opposite to the side(s) from which they were projected into the shared virtual modelling space (i.e. on the inside or underside of the shell).

The number of voxels added may be the lesser of Y voxels or the number needed to reach an opposite existing surface of an object. Y may be chosen to result in a thickness responsive to the weight and strength of the material being used to print the model.

Similarly, the lowest point within the (now extruded) model can be determined. At least two additional points, typically on the underside of the shell, can be extruded further to match the lowest point, thus providing at least three points of support for the physical model. Preferably, these points of support are distributed around a calculated centre of mass of the model.

In this way, a 3D model of the virtual environment can be constructed from plural in-game images that will stay up when physically printed and is viewable from a plurality of angles.

The model is then sent to a 3D printer driver, which slices the model into layers from the bottom up. These layers are then successively printed by the 3D printer as described previously.

As described above, photogrammetry of at least part of the virtual environment can be used to generate a voxel shell that can be used as the basis for 3D printed model. Some environments are more suited to this 3D printing process than others. For example, the simple block-based environment within Minecraft® will lend itself very well to being rendered by a 3D printer.

However, this is the exception rather than the rule. A particular appeal of video games is their ability to present environments and characters that are not bound by the normal rules of physics. In particular, objects may exist in a predetermined relationship to each other without having physical connections (as exemplified by the character 'Blobman' in FIG. 3, whose hands and feet are not physically attached to his torso in this figure), whilst other objects may be defined only in two dimensions within the three-dimensional environment, such as curtains, capes and in many cases environmental components such as walls. This is because physical strength is not a requirement of the virtual environment, where program rules prevent movement beyond certain boundaries, and the walls are simply decorative surfaces for textures demarcating those boundaries.

Hence a virtual environment may comprise several bounding surfaces that have zero thickness, upon which are placed physical objects, some of which may additionally be unstable or unsupported if physically printed. An example of such bounding surfaces may be the walls of the room 210 in the virtual environment 200 of FIG. 3.

It may not be feasible to faithfully print such a virtual environment using a 3D printer.

Accordingly, in an embodiment of the present invention, the voxel shell described previously is modified to take account of physical requirements of the 3D printed model.

As noted previously, the shell of voxels can be extruded to be M voxels thick, to provide some physical strength. This also addresses the problem of 2D objects within the environment, as the shell of voxels corresponding to these objects are extruded in the same as any other element of the shell of voxels.

However for some elements of the environment, this may not provide sufficient physical support, or in the case of aerial objects in the environment, support may be missing entirely.

Procedural Supplementary Geometry

Accordingly, procedurally defined modifications to the voxel shell may be provided for the purposes of 3D printing. These procedural modifications provide structural strength and/or physical support for some elements of the virtual environment that it would not otherwise be feasible to replicate in a 3D printed model.

Hereinafter references to 'printer geometry' refers the voxels created to define the 3D model for printing.

Procedurally generated or modified printer geometry may be generated by the entertainment device once the initial voxel shell has been generated.

The voxel shell is analysed to detect whether additional geometry is required, according to several basic rules.

One analysis step is to detect whether there are unsupported objects within the environment.

If so, then these may be made subject to a de minimis size threshold so that objects below the threshold, such as for example snowflakes, bullets etc., are ignored and subsequently not retained within the 3D model. The associated voxels in the voxel shell may be deleted. Optionally this step may be implemented in a modified rendering process so that these items are never rendered in the first place when collecting images for the model, making the analysis of the images simpler.

Meanwhile for objects that meet the threshold, printer geometry for a support structure such as connecting rod may be procedurally generated between the object and a nearby anchor point, the anchor point being a part of the environment ultimately connected to the ground. The ground itself can be assumed to be connected to the lowest point of the voxel shell. Optionally the analysis can proceed from the lowest part of the voxel shell upwards so that unsupported objects can be sequentially supported, enabling them to support subsequent objects in turn.

Consequently where a video game character is leaping into the air for example, a supporting rod will be formed between the base of their foot and the ground by creating a cylinder of voxels, for example M voxels thick by default.

However, the thickness of the rod may also be procedurally determined according to basic rules. For a given type of printer, the weight by volume of common 3D printer materials and their compression and bending strengths will be known. In addition, the expected size of the printed model will be known. Accordingly, the entertainment device can estimate the weight of unsupported objects, and calculate the thickness of supporting rod needed to adequately support the object within the model. In particular where a connecting rod is partly or wholly lateral and hence may bend, the moment of the unsupported object is a function of its weight multiplied by its distance from the current position along the rod. Furthermore when constructing a connecting rod for such an object, the weight of the connecting rod itself may be a significant proportion of the weight. Consequently the rod may be thicker closer to the anchor point and taper towards the unsupported object as respective parts of the rod support a greater weight at the anchor point than at the unsupported object.

In another analysis step, the above principle can be applied to other parts of the voxel shell; for example a virtual model desk within a game may have legs that are too thin to support the total mass of the desk surface and any objects on the desk. For example, if the desk has a character standing on it, but the desk legs are only a few voxels thick, they may not be strong enough to support the physical model. Accordingly features of the voxel shell can be evaluated to determine the total weight they will be supporting in the model, and where this exceeds a safe margin for the cross sectional area of the voxel shell supporting this weight, this may be thickened by scaling up its cross-section and filling it with voxels. The principle may also for example be applied to trees within the environment, where the cumulative weight of branches and the trunk are used to locally modify the geometry of the branches or trunk to make their cross-section larger to accommodate the weight, in those circumstances where the existing geometry is locally insufficient to accommodate the weight when rendered as a 3D model using the particular materials associated with the 3D printer.

Subsequently, the centre of gravity of the adjusted model may be calculated to detect if it would fall over. If so, then either a support may be moved to restore stability, or optionally the voxel shell may be thickened in one or more selected places to alter the centre of gravity back to a stable position.

As noted previously, two-dimensional components of the environment are extruded along with other parts of the initial voxel shell to create a three-dimensional object with at least a minimum thickness. However, this extrusion process can be further modified as described below.

Figure 10A:
FIGS. 10 A-E are schematic diagrams illustrating a process of generating geometry for 3D printing in accordance with embodiments of the present invention.
Figure 10B:
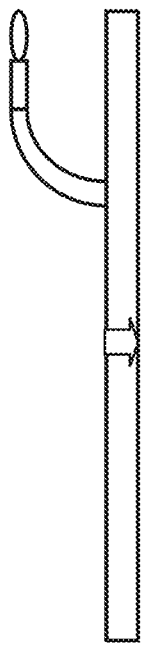
Figure 10C:
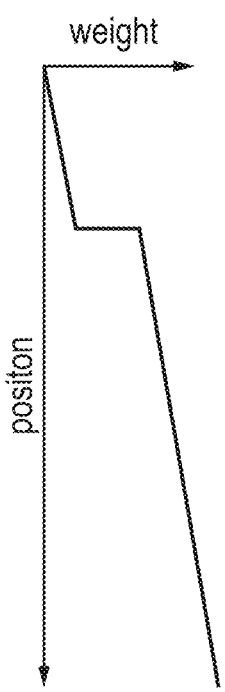

Referring now to FIGS. 10A-E, it will be seen that FIG. 10A represents a two-dimensional wall from the environment 200, upon which a candle and candlestick are placed within the game. FIG. 10B then illustrates an extrusion process to extend the wall in a direction normal to the wall plane and opposite to the side from which the image was projected, to procedurally generate geometry describing a wall with a predetermined thickness, for example of Y voxels. However as can be seen in FIG. 10C, the cumulative weight of the physically printed wall will change according to the position on the wall, and also encounters a step change for parts of the wall additionally supporting the candle and candlestick. Accordingly, a wall of constant thickness may be unsuitable as the thickness of the wall near the base may be insufficient to adequately support the cumulative weight of the model.

Figure 10D:
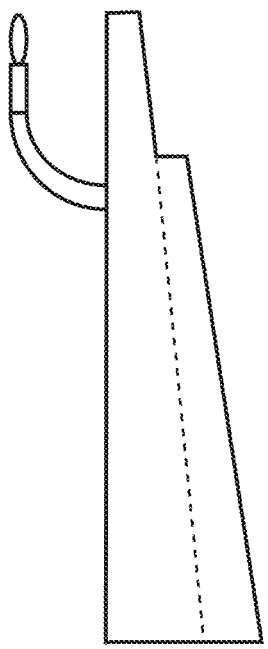
Figure 10E:
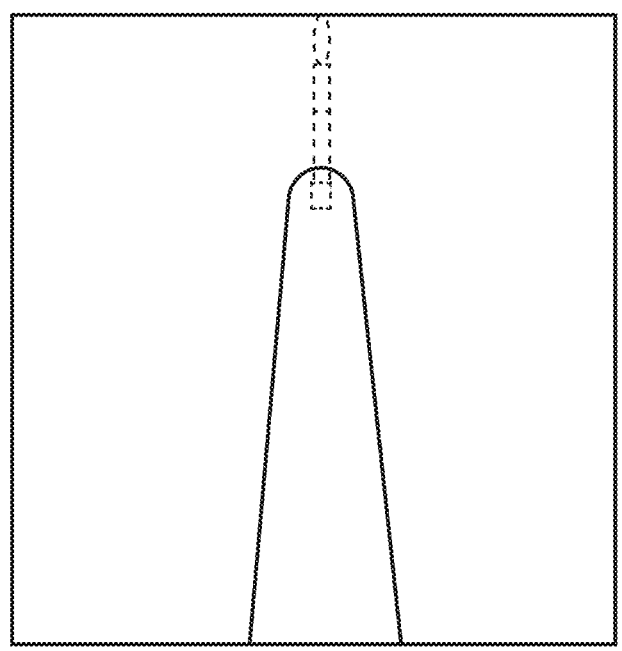

Accordingly, with reference to FIGS. 10D-E, then starting with a minimum preferred thickness of extrusion at the top of the wall, the thickness of the extrusion increases as a function of cumulative weight, resulting in a step change in thickness at the point of attachment of the candlestick to the wall to provide additional support. It will be appreciated that procedural rules may thicken a region around such points of attachment, such that the wall is thickened slightly before the load of the candlestick is applied to the wall, as illustrated in FIGS. 10D-E. In addition, the procedural rules may accommodate the additional mass of the supportive thickening itself when extruding lower portions of the wall.

Finally, the load imposed by the candlestick and the supporting region may be distributed laterally as well as vertically, so that the thickened supporting region splays sideways as it propagates down the wall, as shown in FIG. 10E.

The procedural rules may also interact with additional information provided by a game developer, to assist in generating desirable supplementary geometry automatically.

Figure 11:
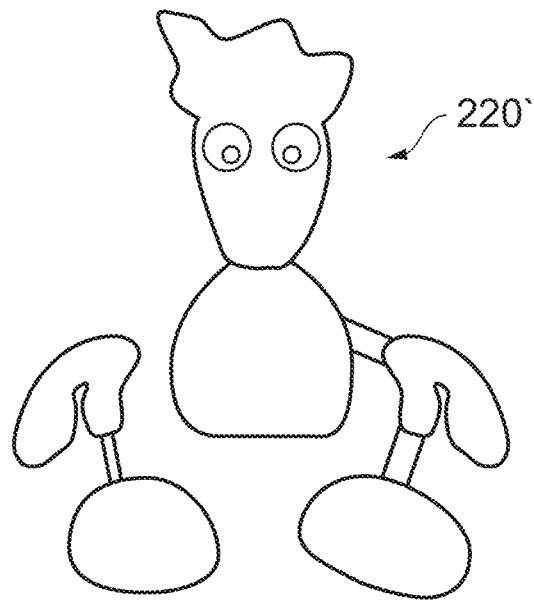
FIG. 11 is a schematic diagram of a 3D printable videogame character in accordance with embodiments of the present invention.

For example, the previously noted rule that a connecting rod is procedurally generated between an unsupported object and the nearest anchor point, where the anchor point is a part of the environment ultimately connected to the ground, may result in 3D model of Blobman 220' as illustrated in FIG. 11. It will be appreciated that when the character's hands are analysed, it is likely that they are closer to the character's feet than to the character's torso, and possibly also that the character's torso will not yet be connected to an anchor structure itself. Accordingly the procedural rules may attach the character's hand to the only grounded anchor points available, which are the feet; subsequently the torso may be anchored to the closest single anchor point, which is now one of the hands. The result is a structure that, whilst stable, does not conform anatomically to what the user might expect.

Figure 12:
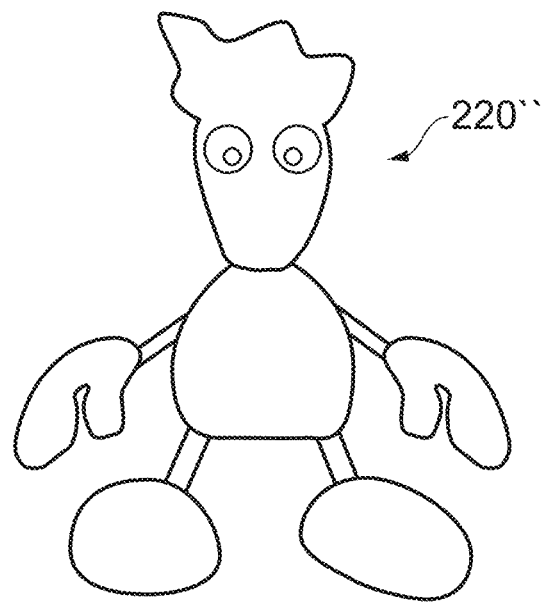
FIG. 12 is a schematic diagram of a 3D printable videogame character in accordance with embodiments of the present invention.

Accordingly, game developers (or users) may identify preferred points of connection between elements of the environment in order to guide the procedural generation of connecting rods or other connecting/support structures. These points of connection may be defined by use of a reserved value within one or more colour channels, enabling points of connection to be identified by use of a specifically coloured identifying pixel within an image; for example if the value 128 was reserved on the blue channel to denote a connecting point, then this can be used in the example of the Blobman character 220" of FIG. 12 to specify where preferred connecting points exist on the model. These reserved values are then used within the voxel shell, creating identifiable anchor points for use with the procedural rules. For example, matching values in the other two colour channels of the identifying pixel can be used to indicate paired connecting points, so that red and green values in the identifying pixel could be the same for the hand and the torso, causing these to be identified as sections to be connected together. In this way, artistic control of the placement of connecting structures can be maintained by the developers without the need for separate metadata. In the case of Blobman, this could be used to ensure an anatomically acceptable set of connecting rods, as can be seen in FIG. 7. Meanwhile, the rules for procedural generation of the connecting/support structure will still determine the required cross-section needed to adequately support the printed structure.

It will also be appreciated that for elements of the supplementary printer geometry not found in the rendered game (such as the connecting rods in the 'Blobman' example above), textures (colours) may be extrapolated from the existing voxel shell, or a no colour may be specified. In the case that colours are extrapolated, optionally the colours may be extrapolated from the portion of the structure supporting an element against gravity (e.g. the ground, or in the case of Blobman, from the feet to the torso, and from the torso to the hands and head, respectively), as this is likely to create the most unobtrusive supporting structure within the model. Alternatively in the case of using no texture, the bare plastic (or other 3D printer material) is left exposed, making it clear to the viewer that this is a functional support that is not part of the original image. Which approach is preferred may be an artistic decision for the user.

It will also be appreciated that the pixel resolution of the rendered images may be higher than the voxel resolution of the 3D printer at the scale chosen for printing. Consequently features of the rendered environment may sometimes have a high spatial frequency relative to the voxel resolution of the 3D printer. Accordingly the images may be filtered to a compatible resolution before projection into the shared virtual model space, to remove such high-frequency detail and thereby avoid aliasing effects in the resulting model. In this case, where reserved colour channel values are to be used by procedural rules, these are preserved or reinserted into the lower resolution image after filtration. The depth information may be similarly filtered.

Hence, using any or the above techniques, or any other suitable techniques, a property of the 3D surface geometry (such as its thickness or connective elements) may be modified to form 3D printable model data that may be output for 3D printing either immediately or prospectively in the future. Consequently, a direct product of modifying a property of the 3D surface geometry to form 3D printable model data that is then output, is 3D printable model data. This 3D printable model data may be output directly to a printer, or alternatively to a local or remote, private or public repository for review by the user or others, prior to any decision to print the model.

Thickening Algorithm

The above example relating to FIGS. 10A-E discloses, for objects in the virtual environment with zero thickness, a method of extruding the object to achieve sufficient thickness for that object to be self-supporting when it is eventually 3D printed.

In the example of the wall illustrated in FIGS. 10 A-E, it is assumed that only one side of the wall is textured (namely, the side facing towards the navigable virtual environment), and so matters of texture and colour were not of concern for the extruded component.

However the situation is different where a texture (sometimes the same, and sometimes different) is visible on both sides of the zero thickness object.

A typical and frequent example of such an object is clothing for the user's in game character, such as a cloak. Also hair is often rendered using zero thickness structures. Other common zero thickness objects include curtains, flags, rugs, paintings and other decorative elements of the environment.

It will be appreciated that whilst such objects have zero thickness, they are rarely two-dimensional in the strict sense of only lying on a single plane and having a single normal; typically the object will undulate and occupy three-dimensional space Hence separately to the issue of a desired physical thickness, there is a potential difficulty in processing elements such as clothing and flags that have zero thickness but different textures/colours on each side.

For example where a scene is captured using the above-described photogrammetry techniques, and/or using point cloud capture, this results in capturing different colour values for coincident points depending on the camera viewpoint (for example, a camera seeing one side of the zero thickness object will capture a first point colour value, was a camera on the other side of the zero thickness object may capture a second different point colour value for the same position).

It is therefore necessary to process such points to choose the correct colours of such an object for a physical representation.

In principle it is possible to address these issues using replacement supplementary geometry that has been thickened as desired, as discussed previously herein. However this may not be possible to implement for technical (storage) or economic reasons. Furthermore, in some cases the zero thickness object may be generated procedurally itself, or animated/warped using physics simulations (e.g. cloth/hair physics), making substitution impractical.

Hence it is preferable to modify the point cloud and thicken the zero thickness object as appropriate either in the point cloud or during translation to voxels for printing.

However simple morphological image processes suitable for thickening objects, such as dilation, do not cope with having different and contradictory textures at the same point in space; typically this results in either the texture on one side of the object being ignored, or an effectively random mixture of pixels from the two textures—for example depending on the order of camera data chosen and/or the number of cameras that captured data for a particular pixel, etc.

Accordingly, in an embodiment of the present invention, points in the point cloud are represented as 3D elements (e.g. voxels), as described previously herein in relation to photogrammetry. Preferably the voxels have a resolution corresponding to the 3D pixel (i.e. voxel) resolution of the target printer, or a higher resolution that lends itself to clean interpolation by a printer driver, such as two or four times higher—although this is not essential. The resolution of the voxels may be the same as or lower than the resolution of the point cloud. The voxel space can be thought of as similar to the point cloud space in that it has a set of coordinates, optionally sharing an origin, and as noted above optionally sharing a resolution, or more typically having a lower resolution. A new voxel is generated when a point in the point cloud is located in the notional volume occupied by a voxel. In practice this may be done simply by mapping a flag indicating the existence of a point in the point cloud from the coordinate system of the point cloud to the corner system of the voxel space, and then providing the newly identified voxel with relevant data, as described below.

Given such a voxel representation of the point cloud, it is possible to store (if/as needed) colours for different faces of the voxel, or generally to store colours for points that are coincident in the point cloud but have different colours at different normal (e.g. opposing/flipped/inverse normals, as on opposite sides of a zero thickness surface). It will be appreciated that as the point cloud has the same or higher resolution than the voxel representation, 'coincident' can mean where two or more points exist within the volume of a given voxel. Hence the purposes of the present invention, where the resolutions are different then 'coincident' is to the resolution of the voxels and not to the points themselves.

Using this voxel representation, it will be appreciated that the majority of voxels will only need to store a single texture/colour value because the corresponding points are part of an external surface of a solid virtual object, and the object does not comprise an additional internal texture. This will be true for example of the Blobman character in FIG. 3 and the character captured using photogrammetry in FIG. 5.

By contrast, and referring to FIGS. 13A and 13B, a flag may have different textures on either side whilst having a zero thickness. In the case of the example figures, one face of the flag is predominantly blue and one is predominantly red.

Referring to FIG. 14A, consequently for a point on the flag a voxel needs to represent different colours on different sides based on the direction of the surface normal of the point being added from the flag. Hence the example voxel in FIG. 14A illustrates two points whose positions are identical but which have different normals and colours (i.e. red facing in one direction and blue facing in the opposite direction). It will be appreciated that the normal on the flag itself may be at an arbitrary vector, but this can be mapped to one of the six faces of the voxel cube for example by transposing the vector to an origin at the centre of the cube and determining from which face the vector exits the cube. More simply, one may assume that the voxel cubes are rectilinearly arranged with respect to a world coordinate system and hence classify the normals to respective surfaces of the voxel cube according to predetermined angular ranges.

In an embodiment of the present invention, when a first point is added to a voxel, all the faces of the voxel take that colour. This simply ensures a texture/colour exists for all sides of the voxel, given that in may not yet be known which sides of the voxel will be exposed to the surface of the 3D printed model.

When subsequent coincident points are encountered and added, the colour of the face of the voxel corresponding to the normal of the subsequent point is changed to correspond to that of the point.

Hence referring now to FIG. 14B (which shows a notional plan view of a voxel and hence only four sides for illustrative purposes), if for example if the first point added was a red point (a) then initially all sides of the voxel would be red. Subsequently if the next point was blue (b) then the face corresponding to the normal for that point would become blue. This would then continue for any additional coincident points (c) until the point cloud capture process was complete. If the voxel representation is of a lower resolution than the point cloud representation, it is possible to have two points within the volume of the voxel whose normals both indicate the same face of the voxel; in this case, an average of the colours for a given face may be calculated, or one of the colour values may be discarded.

Given the above voxel representation of coincident points in the point cloud, it is then possible to thicken the object represented by the voxels to a desired extent whilst preserving the colours of the source object.

For the avoidance of doubt, in the event that the colours 'red' and 'blue' are replaced with hatching in the figures, then the hatching shown in FIG. 14B(a) corresponds to red, and the alternative hatching is blue.

It will be appreciated that for simple 3D printing services which rely on the printer material for colour (rather than using a subsequent painting step) it will be necessary to thicken the model in order to physically render the object, since a single 3D pixel of such a 3D printer cannot have two different colours as it is made from a single deposition of material.

Hence for such printers, it is preferable to increase the thickness of the shape at least so that individual voxels of the object represent a surface of a single colour.

As noted above, most voxels will only have a single colour and so can be processed very efficiently, and the shape may only need to be adjusted for reasons of physical strength/stability as discussed previously herein.

However, where a single voxel comprises two or more colours due to capturing coincident points of a zero thickness object, the following propagation algorithm may be employed to thicken the structure so that each voxel only uses one colour, whilst retaining the pattern of colours captured by the faces of the original voxel.

Figure 15:
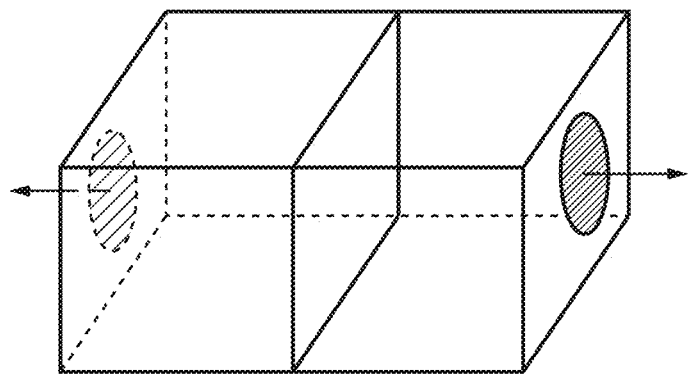
FIG. 15 is a schematic diagram of a voxel and a duplicate voxel highlighting colours associated with respective faces of the voxels in accordance with embodiments of the present invention.

For a zero thickness object with two sides, initially represented at a given position by a single voxel (as in FIG. 14A), then the simplest propagation results in the object being represented at a given position by two voxels, one for the colour of the object on each side, as illustrated in FIG. 15.

Figure 16A:
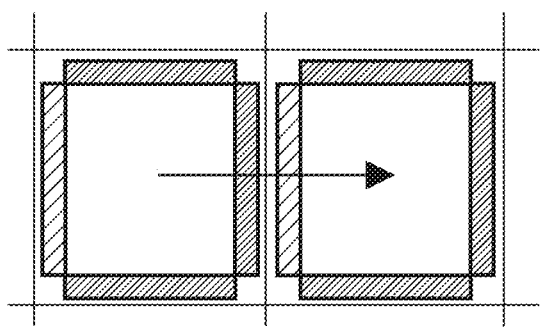
FIGS. 16A and B are schematic diagrams illustrating a first thickening technique in accordance with embodiments of the present invention.
Figure 16B:
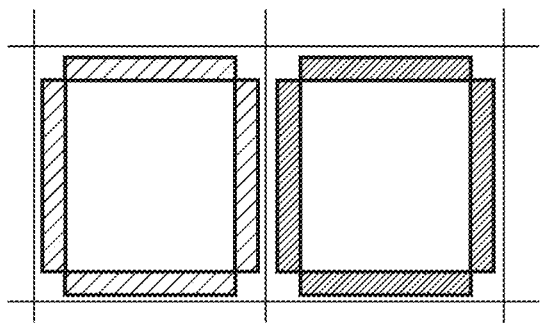

Accordingly, and more generally, a process for thickening the voxel in a desired direction may then proceed as illustrated in FIGS. 16A-B.

FIG. 16A shows a duplication process for the example voxel in FIG. 14B(b), and hence is in plan view on the x-y plane, but the principle is identical for propagation in the z-direction. The original voxel is duplicated to create a second adjacent voxel in a desired direction. The desired direction will be the one parallel to the dissimilar opposing faces of the original voxel. In the illustrated plan-view example, the left and right faces of the original voxel are different and so a new voxel has been propagated on the X axis through both these faces as shown by the arrow.

Now, each voxel can be wholly assigned the colour corresponding to the respective opposing face of the original voxel on the propagation access. Hence the left-hand voxel adopts the colour of the left-hand face of the original voxel whilst the right hand voxel adopts the colour of the right-hand face of the original voxel. More generally therefore the first voxel and the duplicate voxel are respectively assigned the first and second colours according in an order along the first axis corresponding to the order along a first axis of the two opposing faces of the first voxel having the first and second colours. Subsequently at least the external faces of the voxels adopt their respective assigned colour.

It is then possible to print both sides of the zero thickness object using the respective colours seen on each side of the object.

Whilst this addresses the simplest case for the simplest printing capability, it will be appreciated that because a zero thickness object may undulate within three dimensions, and because a voxel may be at the edge of such an object (or may substantially form the object, in the case of strands of hair and the like) then multiple surfaces of a voxel may be visible in the final print and may have different colours. Hence more generally, where it is desirable for a zero thickness (now one voxel thick) object to be thickened further, for example for structural strength or due to colour printing limitations, then this may be done whilst preserving the distribution of colours on the original voxel, as follows:

Such a more general process for thickening the voxel in one or more dimensions may proceed as illustrated in FIGS. 17A-D. The illustration is in plan view (x-y plane), but the principle is identical for propagation in the z-direction.

Figure 17A:
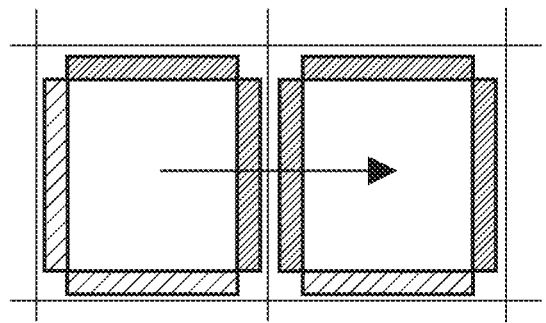
FIGS. 17A to D are schematic diagrams illustrating a second thickening technique in accordance with embodiments of the present invention.

FIG. 17A shows a duplication process for the example voxel in FIG. 14B(c), which is the result of three coincident points having three different normals.

Again, the original voxel is duplicated to create a second adjacent voxel in a first desired direction parallel to dissimilar opposing faces of the original voxel. Again the voxel can simply be duplicated, preserving face colour information. Again in the illustration the duplication is on the x-axis. This time, however, initially the new voxel changes the colour of the face adjacent the original voxel (i.e. face-to-face adjacent, not edge-to-edge adjacent) to match that of the adjacent face of the original voxel. Hence in the illustrated example, the adjacent face is changed from blue to red. In this way, the original pattern on the external faces of the original voxel have been extended in the x-direction whilst the internal faces of the resulting object are colour consistent.

This process may be termed 'pushing out' a new voxel in the desired direction.

The process may continue in another direction, whether because additional thickness is required for structural reasons or for any other reason.

Figure 17B:
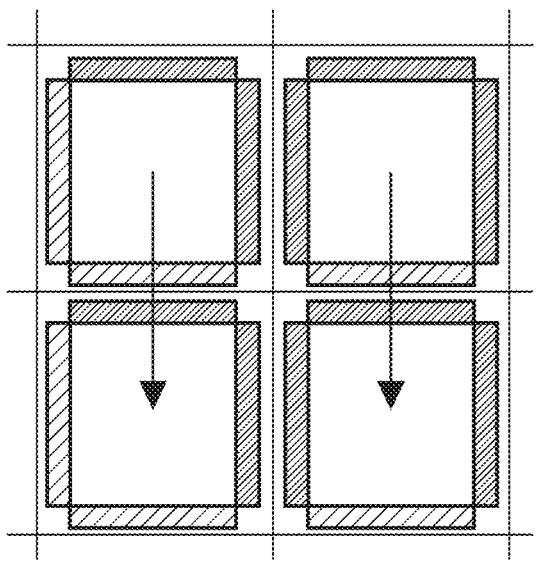
Figure 17C:
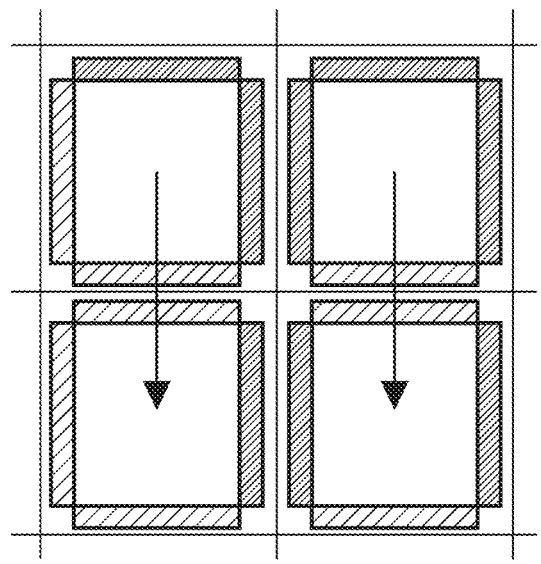

Accordingly, duplication on the y-axis is shown in two steps in FIGS. 17B and 17C.

For the purposes of example, the two voxels of FIG. 17A both have different colour faces when viewed along the Y-axis. Duplicating both in the Y-axis results in the arrangement shown in FIG. 17B. Subsequently matching the internal face colours to the colours of the adjacent faces of the original voxels is shown in FIG. 17C.

It will be appreciated that the four voxels of FIG. 17C now resemble a four times larger version of the original voxel of FIG. 14B(c), and hence the voxel and colour representation of the model has been thickened.

It will be appreciated that by changing the notional x, y and z axes of FIGS. 16 and 17, the same principle may apply for propagation in any one, two or three of these axes, and in any order of axes. Indeed, the process can be applied simultaneously in two or typically three axes.

Figure 17D:
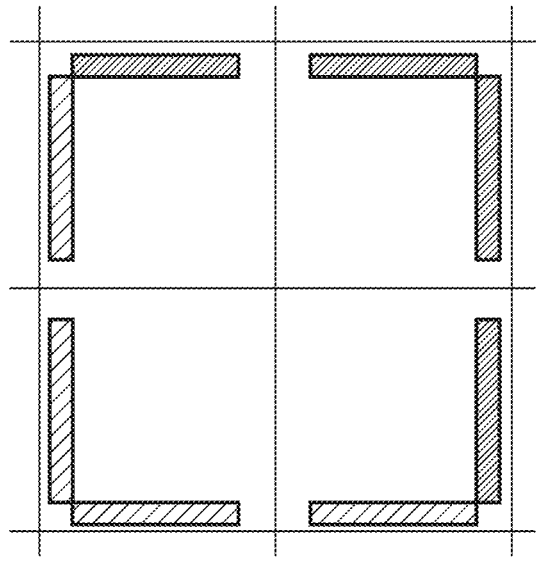

Finally referring now to FIG. 17D, once thickening is complete (as per FIG. 17C) then optionally a clean-up process may be applied in which colour information corresponding to internal faces of the resulting object (i.e. any face of a voxel that is face-on adjacent to a face of another voxel) is deleted, so that only external faces retain colour information, as illustrated by FIG. 17D. Similarly optionally, voxels that have been thickened in this manner to create groups of adjacent voxels may be replaced by larger cubic or rectilinear voxels.

The above thickening techniques are preferably implemented once point cloud generation is complete, as this is when complete information is available about all the coincident points that may be found within the volume of a given original voxel, and furthermore complete information is also available about the position of all potential neighbouring voxels. However alternatively the process can be implemented whenever a subsequent point appears within the original voxel volume that has a colour and/or normal that results in changing the colour of one of the faces of the voxel cube. Clearly in the case of this latter approach, any subsequent point that appears within the volume of one of the newly generated voxels (which potentially may not correspond to/encompass any existing point at that stage I the point cloud generation process) will also need to be treated as if it was a subsequent point for that voxel.

The above examples illustrate the case for thickening or pushing out from a single voxel; however typically voxels will not occur in isolation but will be part of a larger body, such as for example the flag of FIGS. 13A and B.

Hence whilst the basic principle remains the same, additional rules may be imposed relating to selection of the preferred direction for thickening and the order in which to apply this process to voxels of the object.

A first optional rule is that a voxel cannot be propagated into the space occupied by another voxel. In principle this rule is moot because if one voxel is adjacent to another voxel, then one typically will not encounter a point in the point cloud having a normal that points towards the adjacent voxel, as this would indicate that a surface feature of the object is pointing tangentially along the surface or even inwards. However it is possible, if the resolution of the point cloud is significantly higher than the resolution of the voxels such that small surface features facing each other (such as for example corrugations from a normal-mapped texture) are mapped to adjacent voxels so that the normals point to the adjacent voxels, potentially causing the voxels to propagate into each other's space.

A second optional rule relating to prioritising the order of propagation is that where two or more adjacent voxels form a structure that is a single voxel thick in at least one direction, the thickening process begins at one or more edges of the structure and propagates inwards from the edge. A similar optional rule relating to prioritising the order of propagation is that where three or more adjacent voxels form a structure that is a single voxel thick in at least one direction, the thickening process begins with a voxel having a colour face whose colour is most different to the mean (average, median or mode) colour of the structure (for example, using RGB histograms or sum difference values from RGB mean values) and propagates away, the intention being to prioritise distinctive features in the overall object.

It will be appreciated that in any case original voxels may comprise a flag indicating whether or not they have been processed by the thickening algorithm, and new voxels created by the process may similarly comprise a flag indicating that they should not be processed themselves (and hence, depending on the implementation, this may simply be the same flag, in this case falsely indicating that the new voxel has been processed so that is not processed again). There may be a flag for each propagation axis.

It will be appreciated that by use of the above techniques, a zero thickness object having different colours/textures on each side can be 3D printed having sufficient thickness whilst retaining information relating to colours/textures on each side. It will be appreciated that an object having zero thickness will typically result in a point cloud surface that, within the corresponding voxel space, is one voxel layer thick, and where multiple points coincide within the volume of a single voxel their respective normals can be used to determine which face of the voxel is assigned the colour of the corresponding point. Subsequently, voxels can be propagated to a desired thickness using the above techniques, namely by duplicating voxels along an axis of the voxel that intersects different coloured faces of the voxel, then optionally homogenising the colour of internal faces, and/or optionally removing colour information for internal faces, and optionally making the propagation subject to rules that prevent one voxel from propagating into the space occupied by an existing voxel, and/or for prioritising the order of propagation.

Figure 18:
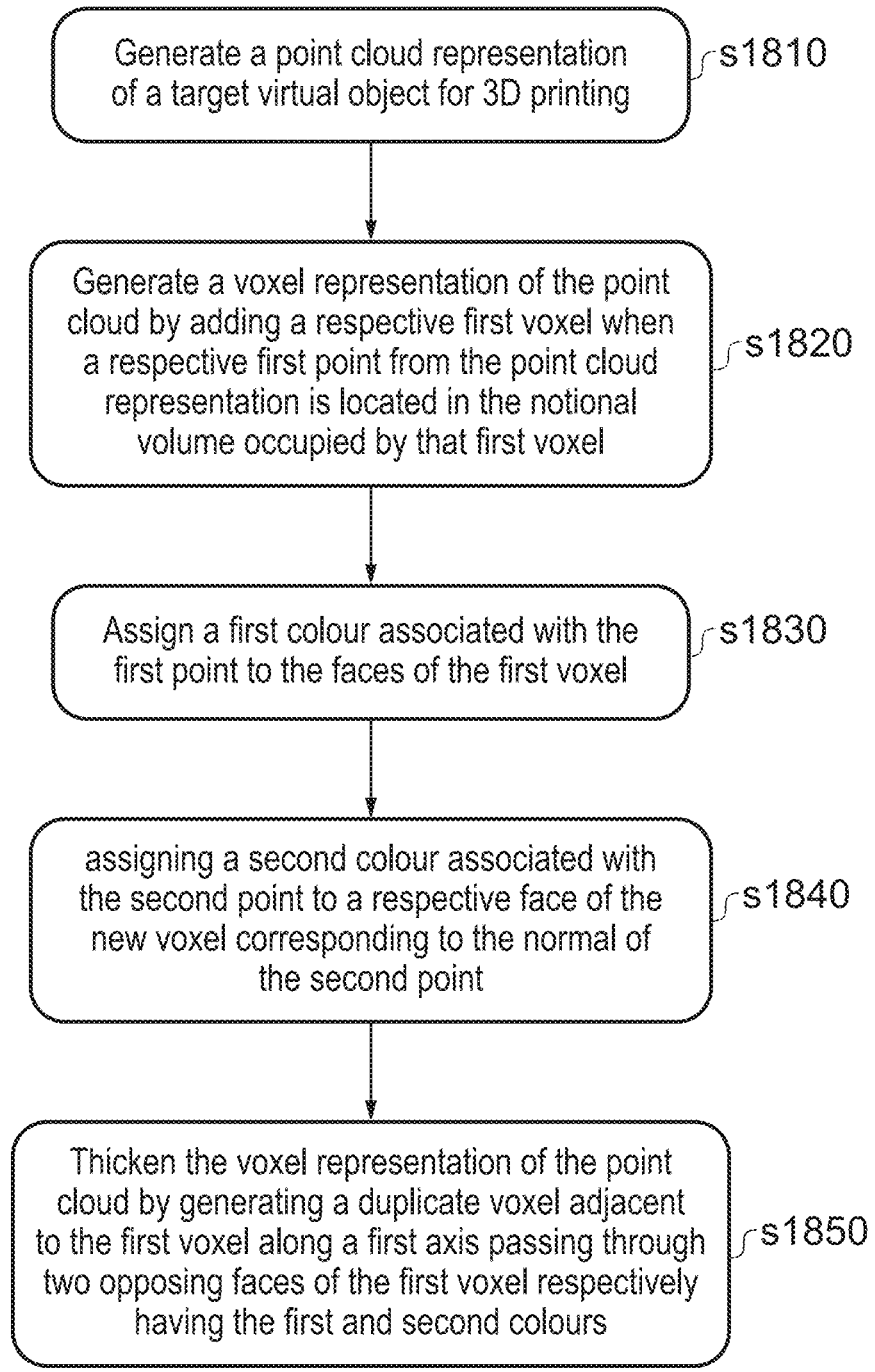
FIG. 18 is a flow diagram of a voxel structure thickening method for a method of 3D print modelling in accordance with embodiments of the present invention.

Hence referring now to FIG. 18, a method of 3D print modelling comprises:

In a first step 1810, generating a point cloud representation of a target virtual object for 3D printing;

In a second step 1820, generating a voxel representation of the point cloud by adding a respective first voxel when a respective first point from the point cloud representation is located in the notional volume occupied by that first voxel;

In a third step 1830, assigning a first colour associated with the first point to the faces of the first voxel; and if a second point from the point cloud representation is located within the volume of the first voxel, In a fourth step 1840, assigning a second colour associated with the second point to a respective face of the new voxel corresponding to the normal of the second point; and In a fifth step 1850, thickening the voxel representation of the point cloud by generating a duplicate voxel adjacent to the first voxel along a first axis passing through two opposing faces of the first voxel respectively having the first and second colours.

It will be apparent to a person skilled in the art that variations in the above method corresponding to operation of the various embodiments of the apparatus as described and claimed herein are considered within the scope of the present invention, including but not limited to:

- target virtual object having at least one part having zero thickness in at least one direction, and optionally the at least one part of the target object having zero thickness has different colours on each side at the same position;
- changing the colour of the face of the duplicate voxel adjacent to the first voxel to match that of the adjacent face of the first voxel;
- removing colour information for internal faces the resulting plurality of voxels, internal faces being those faces face-on adjacent to the face of a different voxel;
- determining whether a duplicate voxel will occupy the same space as an existing voxel, and if so, not performing the duplication;
- the first voxel and the duplicate voxel being respectively assigned the first and second colours according in an order along the first axis corresponding to the order along a first axis of the two opposing faces of the first voxel having the first and second colours;
- generating the point cloud representation of the virtual target object by virtual photogrammetry using the renders of the target virtual object, a direct product of which may be a voxel representation of the point cloud in which at least one voxel has been duplicated by the thickening step;
- generating a 3D printable model data from the voxel representation, and outputting the 3D printable model data for 3D printing, a direct product of which may be 3D printable model data; and
- 3D printing a model based upon the output 3D printable model data, a direct product of which may be a 3D printed model.

Object Selection

The above discussion has assumed that a target object(s) has been selected from a region of the virtual environment; for example, the user may select to just print their avatar, or their avatar and an opponent.

This selection may be done for example by a user interface for defining a bounding box around the desired object(s), or by a user interface for indicating specific objects within the game environment using a cursor or reticule.

Where the object(s) are selected in this manner in isolation from a supporting surface, a default surface such as a flat panel may be generated having an area responsive to the size of the selected object(s). The selected object(s) can then be coupled to the support surface using the techniques described herein.

Editing

Once the printer geometry has been obtained using the above techniques as applicable, then optionally they may be transferred to an editing application for the user to preview or modify the model before sending it to the printer. For example it may be desired to review the model for possible errors, and/or to edit the pose and positioning of certain key characters. The editor may likewise enable the addition of decals, either purely to painted textures, or to the surface structure of objects for example by deleting surface voxels so that the user can effectively engrave messages into a surface of the model.

Final Print

Once the user is satisfied with their 3D model, it may be sent to the printer. As described previously, a printer driver analyses the model and divides it into layers of voxels for successive printing.

Where the printer is a domestic device either physically attached to the console or sharing a home network, then the printer driver may be implemented on the entertainment device, and the resulting drawing list is sent to the printer by the entertainment device.

However optionally a printing service may be provided by the entertainment device's network (that is to say, a network provided for example by the manufacturers of the entertainment device). This may allow access to a more expensive and sophisticated 3D printer than the average consumer could afford, and consequently a better quality model. In these circumstances either the printer driver may still be on the console, to distribute processing load among users, or may be at a central server connected to the 3D printer. In the first instance local printer drivers will generate drawing lists that may be sent securely to a central print queue server, together with meta data relating to the postal address of the user. In the second instance the entertainment device securely sends the 3D model printer geometry to a central printer driver that performs the relevant analysis to generate the required drawing lists before queueing them for printing. In either of these cases, printing of the model may be contingent upon the payment of a fee, for example via a payment card registered with the entertainment device's network, or similarly may be contingent upon the receipt of a voucher which might be earned for example as a trophy or other in-game award, or as part of the purchase price of a game, entitling the user to the creation of a predetermined number of 3D models from that game.

Hence a step of 3D printing a model based upon the output 3D printable model data directly results in a 3D printed model.

Waste Materials

It will be appreciated that 3D Printing techniques such as selective laser sintering can trap large quantities of the raw printer material inside the resulting model. This is because such techniques apply successive layers of powder across the top of the model during printing, fusing only a small proportion corresponding to the model's periphery but leaving the remaining powder inside that periphery untouched. The overall result is a volume of powder within which is a fused shell, with the powder outside that shell being removable, whilst the powder inside the shell is trapped.

This creates unnecessary costs in terms of wasted raw materials. It can also affect the balance of the resulting objects. Consequently it is commonplace to include vents or openings in models designed for 3D Printing to allow the waste powder to be poured or washed out.

However, such vents or openings are not present in videogame characters and are not desirable.

Accordingly, in an embodiment of the present invention, if a powder-based printer is to be used, a procedural rule is implemented to calculate the effective volume of space within objects in the printed scene. Where that volume exceeds a threshold amount, the object is treated as a hollow body and a procedural rule creates an opening in the voxel shell of the hollow body of a size that allows printer powder to flow out. Preferably, the opening is located on the underside of the hollow body and/or on a side facing away from the original viewpoint displayed on screen to the user when they indicated that they wanted to print the scene. The opening may be a hole in the voxel shell, or preferably an annular gap forming a ring or some other shape of closed loop. In the case of an annular gap, this results in a loose cover in the printed body that can be removed to allow the powder out, but which can then by adhered back onto the model, minimising the aesthetic impact of removing the powder on the finished object.

It will be appreciated that a 3D printed scene may comprise multiple such hollow bodies. For example, the scene may comprise the ground, a character such as Blobman, and a tree. The ground is typically an open shell. Meanwhile the tree rests upon it, with the ground forming the base of the tree. Following calculations of the volume within the model, the tree trunk may be identified as a hollow object. Accordingly, a hole may be created in the ground beneath the tree, visible only if the model is viewed from the underside. By contrast, the Blobman character is supported by connecting rods above the ground. Consequently if the character torso is identified as a hollow object, an annular gap is included facing away from the original viewpoint, optionally at a position a threshold distance from any connecting rod. This allows the torso to be drained of powder but also to be repaired by affixing back in place the removable component of the torso created by the annular gap.

Optionally, the procedural rule may use features of the object itself to reduce the aesthetic impact of the hole or annular gap, for example by setting some or all of one or more edges of the hole or gap to follow adjacent a boundary between texture colours in a model, and/or to follow adjacent a ridge or other discontinuity in the model surface.

The system may use the 3D model data to estimate the volume of printer raw material needed, and provide a quote estimating the cost of printing the model before the user commits to doing so.

Referring back to FIG. 1, in an embodiment of the present invention a device 10 (such the Sony Playstation 4) is arranged to generate a model for 3D printing, with the device comprising a point cloud generator (such as APU 20 operating under suitable software instruction) adapted to generate a point cloud representation of a target virtual object for 3D printing, a voxel generator (such as CPU 20A operating under suitable software instruction) adapted to generate a voxel representation of the point cloud by adding a respective first voxel when a respective first point from the point cloud representation is located in the notional volume occupied by that first voxel, a colour assignment processor (such as APU 20 operating under suitable software instruction) adapted to assign a first colour associated with the first point to the faces of the first voxel, and a voxel thickening processor (such as APU 20 operating under suitable software instruction), and if a second point from the point cloud representation is located within the volume of the first voxel, the colour assignment processor is adapted to assign a second colour associated with the second point to a respective face of the new voxel corresponding to the normal of the second point, and the voxel thickening processor is adapted to thicken the voxel representation of the point cloud by generating a duplicate voxel adjacent to the first voxel along a first axis passing through two opposing faces of the first voxel respectively having the first and second colours.

Hence a general purpose computer operating under suitable software instruction can implement the previously described method of thickening voxels where coincident points in a point cloud indicate different colours for different faces of a zero thickness virtual object.

Further, the device may comprise a colour adjustment processor (such as CPU 20A operating under suitable software instruction) adapted to change the colour of the face of the duplicate voxel adjacent to the first voxel to match that of the adjacent face of the first voxel, and/or to remove colour information for internal faces the resulting plurality of voxels, internal faces being those faces face-on adjacent to the face of a different voxel. Similarly the device may comprise a voxel overlap detection processor (such as APU 20 operating under suitable software instruction) adapted to determine whether a duplicate voxel will occupy the same space as an existing voxel, and if so, not performing the duplication. Similarly other processors, typically formed by the APU 20 operating under suitable software instruction, may perform other corresponding steps of the methods and techniques as described herein.

The additional techniques described herein may also be implemented by the device 10 operating under suitable software instruction, and the 3D printing itself may be implemented by the device operating in conjunction with a 3D printer 100.

It will be appreciated that references to the APU and CPU above are purely illustrative and that any suitable processor for a given role may be used.

It will be appreciated from the above description that the methods described herein may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The invention claimed is:

1. A method of 3D print modelling, comprising the steps of:
    generating a point cloud representation of a target virtual object for 3D printing;
    generating a voxel representation of the point cloud by adding a respective first voxel when a respective first point from the point cloud representation is located in the notional volume occupied by that first voxel;
    assigning a first colour associated with the first point to the faces of the first voxel; and
    if a second point from the point cloud representation is located within the volume of the first voxel,
    assigning a second colour associated with the second point to a respective face of the new voxel corresponding to the normal of the second point; and
    thickening the voxel representation of the point cloud by generating a duplicate voxel adjacent to the first voxel along a first axis passing through two opposing faces of the first voxel respectively having the first and second colours.

2. The method of claim 1, in which the target virtual object has at least one part having zero thickness in at least one direction.

3. The method of claim 2, in which the at least one part of the target object having zero thickness has different colours on each side at the same position.

4. The method of claim 1, comprising the step of changing the colour of the face of the duplicate voxel adjacent to the first voxel to match that of the adjacent face of the first voxel.

5. The method of claim 1, comprising the step of removing colour information for internal faces the resulting plurality of voxels, internal faces being those faces face-on adjacent to the face of a different voxel.

6. The method of claim 1, comprising the step of determining whether a duplicate voxel will occupy the same space as an existing voxel, and if so, not performing the duplication.

7. The method of claim 1, in which the first voxel and the duplicate voxel are respectively assigned the first and second colours according in an order along the first axis corresponding to the order along a first axis of the two opposing faces of the first voxel having the first and second colours.

8. The method of claim 1, comprising the step of: generating the point cloud representation of the virtual target object by virtual photogrammetry using the renders of the target virtual object.

9. The method of claim 1, being a voxel representation of the point cloud in which at least one voxel has been duplicated by the thickening step.

10. The method of claim 7 comprising the steps of:
generating a 3D printable model data from the voxel representation, and
outputting the 3D printable model data for 3D printing.

11. The method of claim 10, being 3D printable model data.

12. The method of claim 10 comprising the step of: 3D printing a model based upon the output 3D printable model data.

13. The method of claim 11, being a 3D printed model.

14. A non-transitory, computer readable storage medium having computer executable instructions stored thereon, which when executed by a computer system, causes the computer system to perform 3D print modelling by carrying out actions, comprising:
generating a point cloud representation of a target virtual object for 3D printing;
generating a voxel representation of the point cloud by adding a respective first voxel when a respective first point from the point cloud representation is located in the notional volume occupied by that first voxel;
assigning a first colour associated with the first point to the faces of the first voxel; and
if a second point from the point cloud representation is located within the volume of the first voxel,
assigning a second colour associated with the second point to a respective face of the new voxel corresponding to the normal of the second point; and
thickening the voxel representation of the point cloud by generating a duplicate voxel adjacent to the first voxel along a first axis passing through two opposing faces of the first voxel respectively having the first and second colours.

15. A device arranged to generate a model for 3D printing, comprising:
a point cloud generator adapted to generate a point cloud representation of a target virtual object for 3D printing;
a voxel generator adapted to generate a voxel representation of the point cloud by adding a respective first voxel when a respective first point from the point cloud representation is located in the notional volume occupied by that first voxel;
a colour assignment processor adapted to assign a first colour associated with the first point to the faces of the first voxel; and
a voxel thickening processor; and
if a second point from the point cloud representation is located within the volume of the first voxel,
the colour assignment processor is adapted to assign a second colour associated with the second point to a respective face of the new voxel corresponding to the normal of the second point; and
the voxel thickening processor is adapted to thicken the voxel representation of the point cloud by generating a duplicate voxel adjacent to the first voxel along a first axis passing through two opposing faces of the first voxel respectively having the first and second colours.

* * * * *